(12) United States Patent  (10) Patent No.: US 7,851,123 B2
Suzuki  (45) Date of Patent: *Dec. 14, 2010

(54) DYE CONTAINING CURABLE COMPOSITION, COLOR FILTER AND METHOD FOR PRODUCING THE SAME

(75) Inventor: Nobuo Suzuki, Shizuoka-ken (JP)

(73) Assignee: Fujifilm Corporation, Tokyo (JP)

( * ) Notice: Subject to any disclaimer, the term of this patent is extended or adjusted under 35 U.S.C. 154(b) by 1456 days.

This patent is subject to a terminal disclaimer.

(21) Appl. No.: 10/976,080

(22) Filed: Oct. 29, 2004

(65) Prior Publication Data

US 2005/0113478 A1  May 26, 2005

(30) Foreign Application Priority Data

Oct. 31, 2003  (JP)  ............................. 2003-372606

(51) Int. Cl.
G03F 7/00  (2006.01)
(52) U.S. Cl. ....................................... 430/270.1; 430/7
(58) Field of Classification Search ..................... 430/7, 430/270.1, 311, 321; 540/121, 133
See application file for complete search history.

(56) References Cited

U.S. PATENT DOCUMENTS

| | | | | |
|---|---|---|---|---|
| 5,234,791 A | * | 8/1993 | Dammel et al. | 430/270.1 |
| 5,284,943 A | * | 2/1994 | Tai et al. | 540/121 |
| 5,478,680 A | * | 12/1995 | Hishiro et al. | 430/7 |
| 5,804,102 A | | 9/1998 | Oi et al. | |
| 5,830,267 A | * | 11/1998 | Zambounis et al. | 106/413 |
| 6,589,672 B1 | * | 7/2003 | Kobayashi et al. | 428/690 |
| 6,713,227 B2 | | 3/2004 | Machiguchi et al. | |
| 7,575,837 B2 | | 8/2009 | Fujimori et al. | |
| 7,645,545 B2 | * | 1/2010 | Fujimori | 430/7 |
| 2002/0045111 A1 | | 4/2002 | Machiguchi et al. | |
| 2004/0185372 A1 | | 9/2004 | Takakuwa | |
| 2005/0113478 A1 | | 5/2005 | Suzuki | |
| 2006/0051685 A1 | | 3/2006 | Fujimori et al. | |
| 2006/0246364 A1 | * | 11/2006 | Fujimori | 430/7 |
| 2006/0257762 A1 | | 11/2006 | Fujimori | |
| 2007/0072096 A1 | * | 3/2007 | Takakuwa et al. | 430/7 |
| 2007/0190435 A1 | * | 8/2007 | Takakuwa et al. | 430/7 |
| 2007/0212623 A1 | * | 9/2007 | Takakuwa et al. | 430/7 |
| 2009/0047585 A1 | | 2/2009 | Seto et al. | |

FOREIGN PATENT DOCUMENTS

| JP | 1-102469 A | 4/1989 |
|---|---|---|
| JP | 2-127602 A | 5/1990 |
| JP | 2-199403 A | 8/1990 |
| JP | 2-276866 A | 11/1990 |
| JP | 3-195783 A | 8/1991 |
| JP | 6-75375 A | 3/1994 |
| JP | 7-013014 A | 1/1995 |
| JP | 7-140654 A | 6/1995 |
| JP | 7-111485 B2 | 11/1995 |
| JP | 11-302285 | * 11/1999 |
| JP | 2002-14222 A | 1/2002 |
| JP | 2002-196481 A | 7/2002 |
| JP | 2002-278056 A | 9/2002 |
| JP | 2002-338825 | * 11/2002 |
| JP | 2004-139050 A | 5/2004 |
| JP | 2004-295116 A | 10/2004 |
| JP | 2005-227722 A | 8/2005 |
| JP | 2005-266149 A | 9/2005 |
| WO | 2005/083521 A1 | 9/2005 |
| WO | 2006/013697 A1 | 2/2006 |

OTHER PUBLICATIONS

Computer-generated translation of JP-2002-338825 (Nov. 27, 2002).

* cited by examiner

*Primary Examiner*—Cynthia H Kelly
*Assistant Examiner*—Anca Eoff
(74) *Attorney, Agent, or Firm*—Sughrue Mion, PLLC

(57) ABSTRACT

The present invention provides a dye-containing curable composition comprising at least an alkali-soluble resin, a dye and a photosensitive compound, the dye being an azaporphyrin compound represented by the following formula (1);

Formula (1)

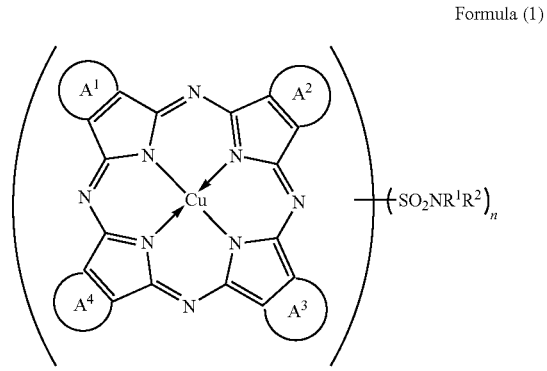

wherein $R^1$ and $R^2$ each independently represent a hydrogen atom or a substituted or unsubstituted alkyl group; rings represented by $A^1$, $A^2$, $A^3$ and $A^4$ each independently represent a ring structure represented by the following formula (A) or formula (B); at least one of $A^1$, $A^2$, $A^3$ and $A^4$ is a ring structure represented by the following formula (B); and n represent an integer from 1 to 4:

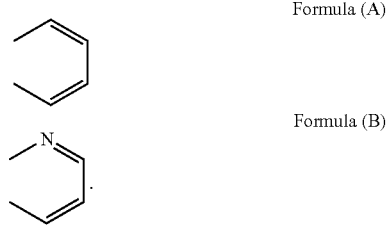

Formula (A)

Formula (B)

10 Claims, 4 Drawing Sheets

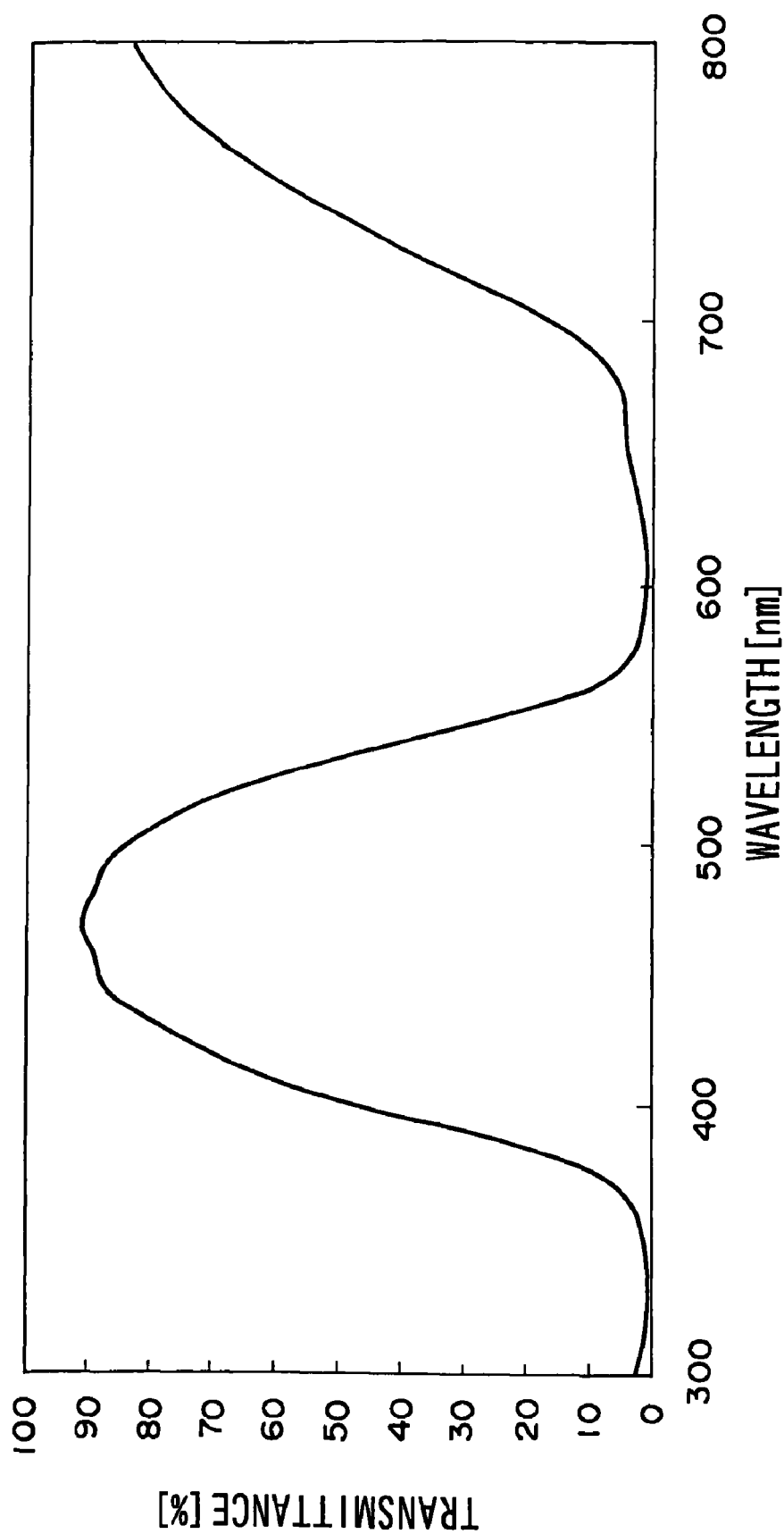
F I G. 2

DYE CONTAINING CURABLE COMPOSITION, COLOR FILTER AND METHOD FOR PRODUCING THE SAME

CROSS-REFERENCE TO RELATED APPLICATION

This application claims priority under 35USC 119 from Japanese Patent Application No. 2003-372606, the disclosures of which is incorporated by reference herein.

BACKGROUND OF THE INVENTION

1. Field of the Invention

The present invention relates to a dye-containing curable composition favorable for forming a colored image of a color filter used for liquid crystal displays and solid state image pick-up elements, a color filter such as electroluminescence color filters, and a method for producing the same.

2. Description of the Related Art

A dyeing method, an electrodepositing method, a printing method and a pigment dispersing method have been known for producing a color filter used for liquid crystal elements and solid state image pick-up elements.

In the dyeing method, a dyeing substrate comprising natural resins such as gelatin, glue and casein, or a synthetic resin such as an amine-modified polyvinyl alcohol is dyed with a dye such as an acid dye to produce a color filter.

However, the color filter described above involves a problem in light fastness, heat resistance and moisture resistance since the dye is used in the dyeing method. Moreover, irregular coloring is liable to occur since it is difficult to uniformly control dyeing adhesivity of the dye in forming a filter for a large size screen. While the production process becomes complicated because a dye-preventive layer should be provided for dyeing.

The electrodepositing method is such a method for producing a color filter in that a transparent electrode is previously formed in a prescribed pattern, and a resin containing a pigment dissolved or dispersed in a solvent is ionized, to which a voltage is applied to form a colored image in the form of the pattern.

In the electrodepositing method, a photolithographic process containing film formation and etching for the transparent electrode is necessary in addition to a transparent electrode for displaying. In the case where an electric short circuit is formed at this time, line defects are formed to cause reduction in yield. Furthermore, patterns other than stripe patterns, for example, mosaic patterns, are difficult to be applied in principle, and also, there is such a problem in that the transparent electrode is difficult to be handled.

The printing method is a simple method for producing a color filter by printing, such as offset printing, by using ink formed by dispersing a pigment in a thermosetting resin or an ultraviolet ray curable resin. However, an ink that can be used has a high viscosity to make filtration difficult, whereby defects are liable to occur due to dusts, foreign matter and gelled matters of the ink binder, and there are problems in positional accuracy, line width accuracy and surface smoothness associated with printing accuracy.

The pigment dispersing method is a method for producing a color filter by a photolithographic process using a colored radiation sensitive composition containing a pigment dispersed in various kinds of photosensitive compositions. This method is stable to light and heat owing to the use of the pigment, and sufficient positional accuracy is ensured since patterning is carried out by a photolithographic process. Therefore, it is a method suitable for producing a color filter for a large size and high definition color display.

As the pigment dispersing method, Japanese Patent Application Laid-Open (JP-A) No. 1-102469 discloses a negative-type photosensitive composition comprising a photopolymerizable monomer and photopolymerization initiator together in an alkali-soluble resin. However, although the color filter for the solid state image pick-up element has been required to be further fine in recent years, resolution of the color filter cannot be essentially improved since the pigment is dispersed as granules with a certain diameter by conventional dye dispersion methods. It was also a problem that irregular coloring tends to be generated due to coarse particles of the pigment. Accordingly, the pigment dispersing method was not suitable for uses requiring a fine pattern as in the solid state image pick-up element.

For attaining high resolution of the color filter, a technology such as the dyeing method using the dye as a colorant has been investigated. Examples of the dye-containing curable composition using the dye include a positive-type photosensitive composition using a naphthoquinone diazide compound as a photosensitive compound as disclosed in JP-A No. 2-127602, and a negative-type composition comprising a photopolymerization initiator (with a cross-linking agent) as a photosensitive compound as disclosed in JP-A No. 6-75375. However, solubility of the dye in solvents is a problem in these dye-containing curable compositions with an additional problem of low heat resistance and light fastness of the dye.

In relation to the problems above, the phthalocyanine compound may be used as the dye excellent in heat resistance and light fastness. However, it is a practical problem that solubility of the phthalocyanine compound in the solvent is poor. On the contrary, increasing the solubility in the solvent causes another problem of decrease of heat resistance and light fastness. Consequently, dye-containing curable compositions having good heat resistance and light fastness using a dye provided with good solubility in the solvent as well as heat resistance and light fastness, and color filters using the compositions, have not been available yet.

For example, JP-A Nos. 3-195783 and 2-276866 disclose sulfonic acid amide-substituted compounds and tetrazaporphyrin compounds as phthalocyanine compounds having improved solubility in solvents. However, since these compounds have a maximum absorbance wavelength in the range of 650 to 670 nm, they cannot exhibit clear blue color. Furthermore, although the uses of these compounds are disclosed as ink-jet inks, no examples of using the compounds as color filters have been mentioned yet.

SUMMARY OF THE INVENTION

Accordingly, it is an object of the present invention to provide a dye-containing curable composition suitable for exhibiting a cyan color and a blue color by combining with another dye (for example a violet dye). Another object of the invention is to provide a stable dye-containing curable composition containing an azaporphyrin base phthalocyanine compound and being excellent in heat resistance and light fastness.

A different object of the invention is to provide a color filter having excellent spectroscopic characteristics with clear and good hue while being excellent in heat resistance and light fastness, and a method for producing the color filter that is constructed so as to have high resolution with good rectangular patterns and is provided with good heat resistance and light fastness.

The inventors have completed the invention through intensive studies by solving the aforementioned problems of the azaporphyrin compound having a specified structure, and by finding that a photosensitive (particularly sensitive to cyan color) curable composition composed of the compound above, which has strong absorption at a clear blue wavelength of around 600 nm, is excellent in solubility in solvents, exhibits good heat resistance and light fastness.

A first aspect of the invention is to provide a dye-containing curable composition comprising at least an alkali-soluble resin, a dye and a photosensitive compound, wherein the dye is an azaporphyrin compound represented by the following formula 1);

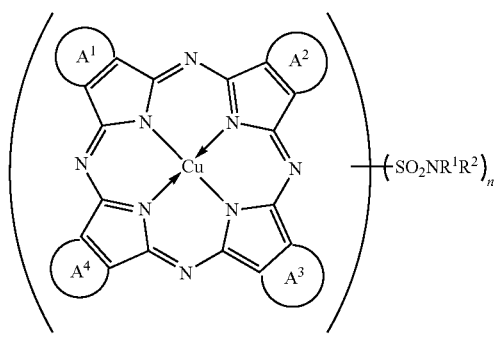

Formula (1)

wherein $R^1$ and $R^2$ each independently represent a hydrogen atom or a substituted or unsubstituted alkyl group; rings represented by $A^1$, $A^2$, $A^3$ and $A^4$ each independently represent a ring structure represented by the following formula (A) or formula (B); at least one of $A^1$, $A^2$, $A^3$ and $A^4$ is a ring structure represented by the following formula (B); and n represent an inteer from 1 to 4:

Formula (A)

Formula (B)

A second aspect of the invention is to provide a color filter comprising at least an alkali-soluble resin and a dye, wherein the dye is an azaporphyrin compound represented by the following formula (1):

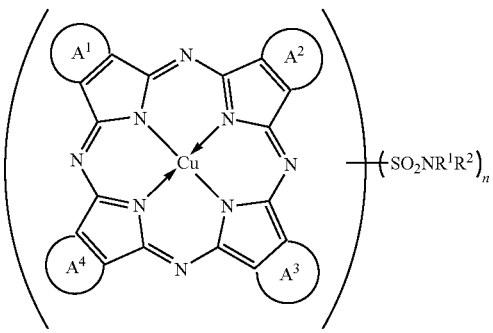

Formula (1)

wherein $R^1$ and $R^2$ each independently represent a hydrogen atom or a substituted or unsubstituted alkyl group; rings represented by $A^1$, $A^2$, $A^3$ and $A^4$ each independently represent a ring structure represented by the following formula (A) or formula (B); at least one of $A^1$, $A^2$, $A^3$ and $A^4$ is a ring structure represented by the following formula (B); and n represent an integer from 1 to 4:

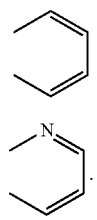

Formula (A)

Formula (B)

For example, the color filter of the invention may be constructed using the dye-containing curable composition of the invention.

A third aspect of the invention is to provide a method for producing a color filter comprising: applying the dye-containing curable composition on a substrate; exposing the dye-containing curable composition through a mask; and forming a pattern image by development.

In the method for producing a color filter described above comprising desired hues, the process above are repeated by the number of the desired hues. In a preferable embodiment, the method may comprise a curing the pattern image by heating and/or exposing, if necessary.

BRIEF DESCRIPTION OF THE DRAWINGS

FIG. 2 shows a spectroscopic spectrum of the dye obtained in Example 2.

DETAILED DESCRIPTION OF THE INVENTION

Figure 1:
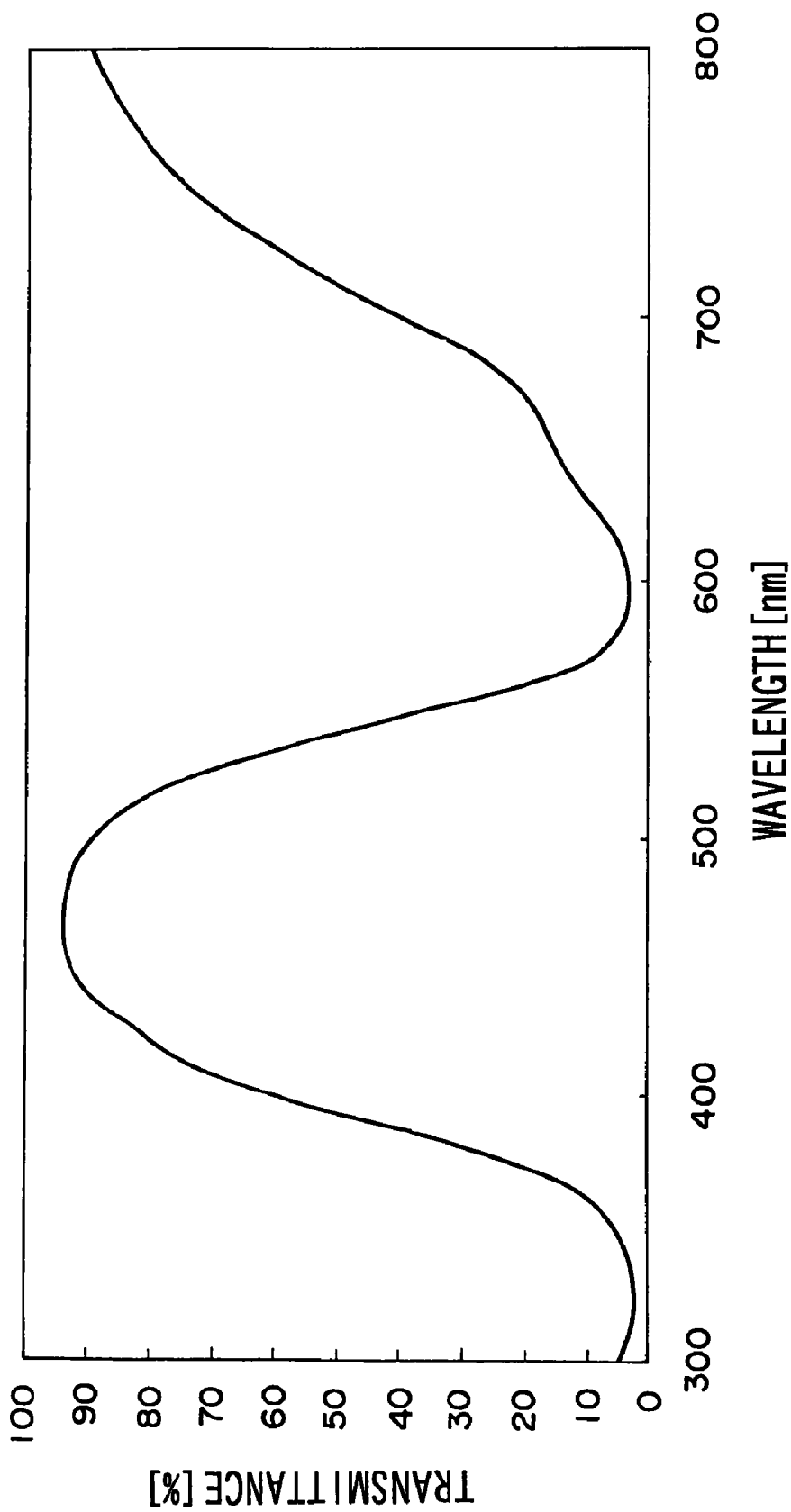
FIG. 1 shows a spectroscopic spectrum of the dye obtained in Example 1.

The dye-containing curable composition of the present invention comprises at least an alkali-soluble resin, a dye and a photosensitive compound, and the dye is a azaporphyrin compound represented by the following formula (1):

Formula (1)

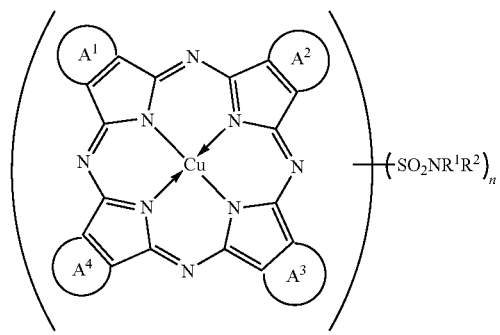

wherein $R^1$ and $R^2$ each independently represent a hydrogen atom or a substituted or unsubstituted alkyl group; rings represented by $A^1$, $A^2$, $A^3$ and $A^4$ each independently represent a ring structure represented by the following formula (A) or formula (B); at least one of $A^1$, $A^2$, $A^3$ and $A^4$ is a ring structure represented by the following formula (B); and n represent an integer from 1 to 4:

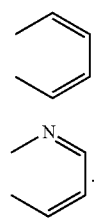

Formula (A)

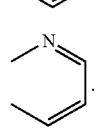

Formula (B)

As described previously, the phthalocyanine dye has insufficient spectroscopic characteristics with quite poor solubility for applying the phthalocyanine dye to color filters. Accordingly, it was quite difficult to produce the color filter by a coating method of the dye-containing curable composition. Solubility of the dye-containing curable composition is also insufficient when preserved as a solution. Consequently, storability of the composition is poor due to precipitation of the dye with time to render the composition poor in practical uses.

However, good spectroscopic characteristics can be obtained in the invention by using a specified azaporphyrin compound represented by formula (1) as the dye. Increasing the solubility of the dye in the solvent also permits precipitation of the dye from the dye-containing curable composition and precipitation of the dye from applied films to be reduced to enable a stable curable composition to be provided. Improved heat resistance and light fastness also permits a high performance color filter to be obtained. The dye-containing curable composition, the color filter and the method for producing the color filter of the invention will be described in detail hereinafter.

Dye-Containing Composition

The dye-containing curable composition of the invention comprises at least (A) an alkali-soluble resin, (B) a dye and (C) a photosensitive compound, and (D) a solvent is usually incorporated therein.

The dye-containing curable composition of the invention can be constructed as a positive-type photosensitive composition when it contains a naphthoquinone diazide compound as (C) the photosensitive compound, while it can be constructed as a negative-type photosensitive composition when it contains a photopolymerization initiator. (E) a cross-linking agent may be also included when the composition is the negative-type photosensitive composition. (E) the cross-linking agent may be contained (preferably together with a photopolymerization initiator) when the composition is constructed as the positive-type photosensitive composition. Other components may be included, if necessary.

(B) Dye

First, (B) dye is described. According to the intensive studies of the invention by the inventors, the dye exhibits a clear blue color by strongly absorbing the light with a wavelength around 600 nm while having excellent solubility in solvents, by using the azaporphyrin compound represented by the following formula (1). The photosensitive curable composition (particularly for the cyan colors) comprising the azaporphyrin compound also exhibits good heat resistance and light fastness:

Formula (1)

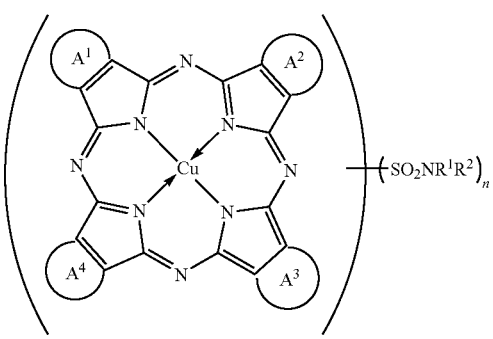

wherein $R^1$ and $R^2$ each independently represent a hydrogen atom or a substituted or unsubstituted alkyl group; rings represented by $A^1$, $A^2$, $A^3$ and $A^4$ each independently represent a ring structure represented by the following formula (A) or formula (B); at least one of $A^1$, $A^2$, $A^3$ and $A^4$ is a ring structure represented by the following formula (B); and n represent an integer from 1 to 4:

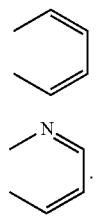

Formula (A)

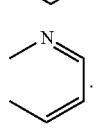

Formula (B)

In formula (1), $-SO_2NR^1R^2$ is a substituent linked to $A^1$ to $A^4$ or nitrogen atom in formula (1). $A^1$, $A^2$, $A^3$ and $A^4$ in formula (1) may comprise substituent other than $-SO_2NR^1R^2$.

$R^1$ and $R^2$ in the azaporphyrin compound of the invention are preferably hydrogen atoms or compounds (alkyl groups) represented by the following formula (2): However, $R^1$ and $R^2$ are not a hydrogen atom simultaneously.

Formula (2)

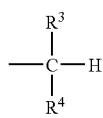

wherein $R^3$ and $R^4$ each independently represent a hydrogen atom, a unsubstituted alkyl group, an alkyl group containing an oxygen atom in the form of an ether bonds, a carbonyl bonds or an ester bonds, an alkylcarbonyl group or an alkoxycarbonyl group.

The azaporphyrin compound, in which $R^3$ and $R^4$ in formula (2) each independently is an alkyl group with a carbon number of 1 to 12, an alkyl group with a carbon number of 1 to 12 containing 1 to 4 oxygen atoms in the form of ether bonds, carbonyl bonds or ester bonds, an alkylcarbonyl group with a carbon number of 2 to 12, or an alkoxycarbonyl group with a carbon number of 2 to 12, is particularly preferable due to its high solubility in organic solvents.

$R^1$ and $R^2$ each independently represent a hydrogen atom, or a substituted or unsubstituted alkyl group. The substituted or unsubstituted alkyl group is preferably represented by formula (2).

When $R^1$ and $R^2$ represent a unsubstituted alkyl group, the compound corresponds to a compound in which $R^3$ and $R^4$ are hydrogen atoms or unsubstituted alkyl groups. The unsubstituted alkyl group represented by formula (2) in which $R^3$ and $R^4$ are unsubstituted alkyl groups is preferably an alkyl group with a carbon number of 1 to 12, and examples of them include methyl group, ethyl group, propyl group, isopropyl group, butyl group, isobutyl group, pentyl group, hexyl group and octyl group.

When $R^1$ and $R^2$ represent the unsubstituted alkyl groups, examples of the unsubstituted alkyl group include linear or branched alkyl groups such as methyl group, ethyl group, n-propyl group, isopropyl group, n-butyl group, isobutyl group, n-hexyl group, 2-ethylhexyl group, n-octyl group and n-dodecyl group, and linear or branched alkyl groups with a carbon number of 1 to 18 are preferable among them.

When $R^1$ or $R^2$ is a substituted alkyl group, at least one of $R^3$ or $R^4$ in formula (2) is preferably an alkyl group containing oxygen atoms in the form of ether bonds, carbonyl bonds or ester bonds, an alkylcarbonyl group or an alkoxycarbonyl group.

Examples of the substituted alkyl group represented by formula (2) in which $R^3$ or $R^4$ are alkyl groups containing oxygen atoms in the form of ether bonds, carbonyl bonds or ester bonds are preferably the alkyl groups with a carbon number of 1 to 12 containing 1 to 4 oxygen atoms. Examples of the alkyl group with a carbon number of 1 to 12 containing 1 to 4 oxygen atoms include methoxyethyl group, ethoxyethyl group, methoxyethoxyethyl group, ethoxyethoxyethyl group, acetylmethyl group, acetylethyl group, propyonylmethyl group, propyonylethyl group, tetrahydrofurfuryloxymethyl group, 2,2-dimethyl-1,3-dioxolane-4-methoxymethyl group, 2-(1,3-dioxolane)ethoxymethyl group, 2-(1,3-dioxane)ethoxymethyl group, methoxycarbonylmethyl group, ethoxycarbonylethyl group, propoxycarbonylethyl group, butoxycarbonylethyl group and pentoxycarbonylbutyl group.

The substituted alkyl group represented by formula (2) in which $R^3$ and $R^4$ are alkylcarbonyl groups or alkoxycarbonyl groups preferably has a carbon number of 2 to 12. Examples of the alkylcarbonyl group or alkoxycarbonyl group include acetyl group, propionyl group, propylcarbonyl group, methoxycarbonyl group, ethoxycarbonyl group, propoxycarbonyl group, butoxycarbonyl group and pentoxycarbonyl group.

$A^1$ to $A^4$ in formula (1) represent cyclic structures represented by the formulae (A) and (B). However, at least one of $A^1$ to $A^4$ is a cyclic structure represented by formula (B).

$A^1$ to $A^4$ (formulae (A) and (B)) may comprise substituent other than $-SO_2NR^1R^2$, for example alkyl groups such as methyl, ethyl and propyl groups; alkoxy groups such as methoxy, ethoxy and propoxy groups; halogen atoms such as chlorine, bromine and fluorine; and nitro group.

The azaporphyrin compound of the invention is represented by formula (1) as described above, and $A^1$, $A^2$, $A^3$ and $A^4$ represent the rings selected from the formulae (A) and (B). The azaporphyrin compound of the invention comprises many isomers depending on the direction of ring condensation and the positions of substitution of substituents. Specifically, the basic frame of the ring comprises five structures of (3) to (7) below. Positional isomers having different positions of N may be also formed depending on the difference of the direction of ring condensation. These isomers also form respective isomers having different substitution positions of the substituents.

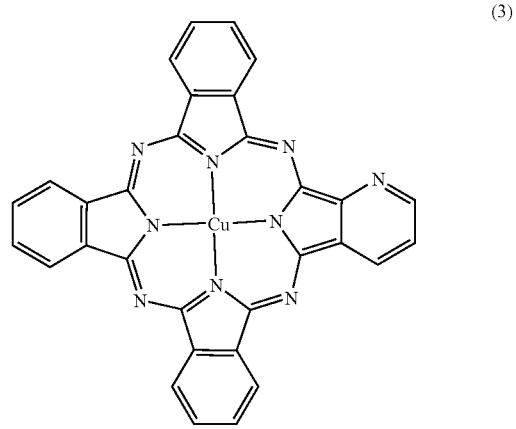

(3)

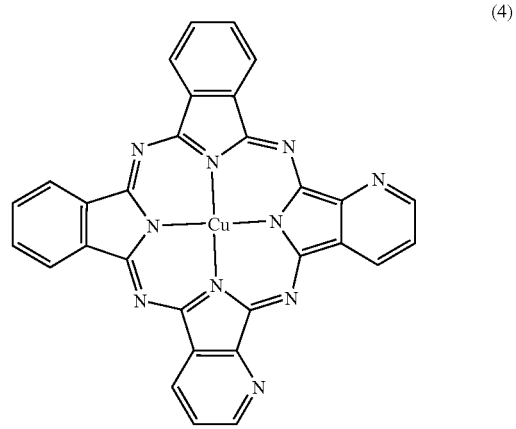

(4)

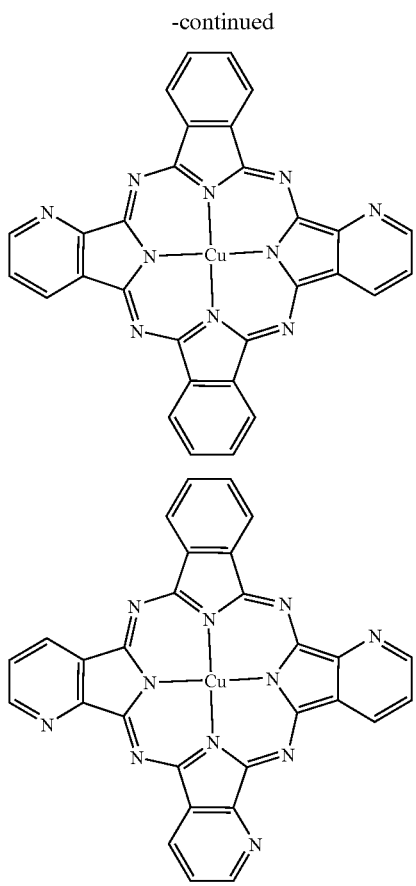

(5)

(6)

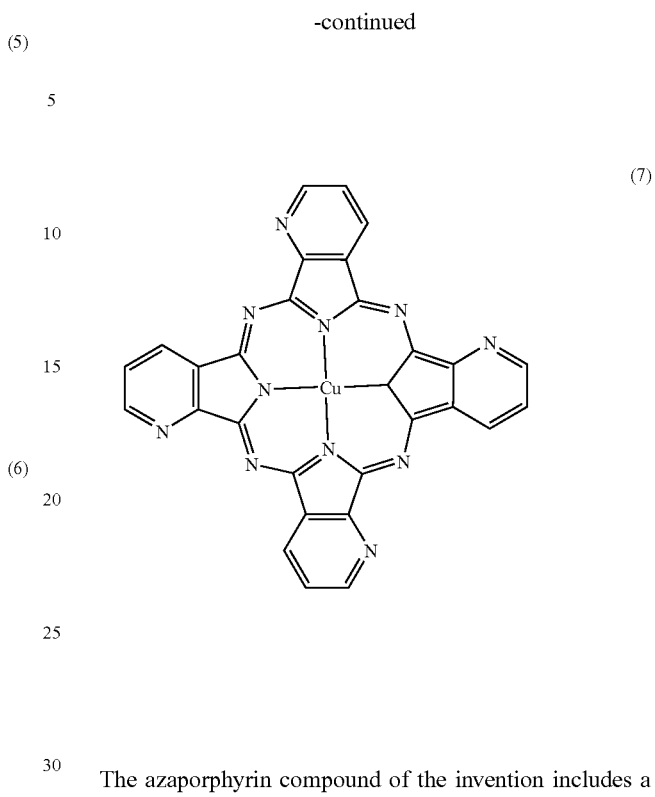

(7)

The azaporphyrin compound of the invention includes a part or all of these many isomers.

Specific examples of the azaporphyrin compound of the invention are shown in Table 1 to 9. However, the scope of the invention is not restricted by these examples.

TABLE 1

| No. of Specific examples | Number of (benzene ring) | Number of (pyridine ring) | n | $R^1$ | $R^2$ |
|---|---|---|---|---|---|
| 1 | 3 | 1 | 1 | H | —$C_2H_4OC_2H_5$ |
| 2 | 3 | 1 | 2 | H | —$C_2H_4OC_2H_5$ |
| 3 | 3 | 1 | 3 | H | —$C_2H_4OC_2H_5$ |
| 4 | 3 | 1 | 4 | H | —$C_2H_4OC_2H_5$ |
| 5 | 3 | 1 | 1 | —$C_2H_4OC_2H_5$ | —$C_2H_4OC_2H_5$ |
| 6 | 3 | 1 | 1 | H | —$C_3H_6OC_4H_9$ |
| 7 | 3 | 1 | 2 | H | —$C_3H_6OC_4H_9$ |
| 8 | 3 | 1 | 3 | H | —$C_3H_6OC_4H_9$ |
| 9 | 3 | 1 | 4 | H | —$C_3H_6OC_4H_9$ |
| 10 | 3 | 1 | 1 | —$C_2H_4OCH_3$ | —$C_2H_4OCH_3$ |

TABLE 1-continued

| No. of Specific examples | Number of ⬡ | Number of pyridine | n | R¹ | R² |
|---|---|---|---|---|---|
| 11 | 3 | 1 | 2 | —C₂H₄OCH₃ | —C₂H₄OCH₃ |
| 12 | 3 | 1 | 3 | —C₂H₄OCH₃ | —C₂H₄OCH₃ |
| 13 | 3 | 1 | 4 | —C₂H₄OCH₃ | —C₂H₄OCH₃ |
| 14 | 3 | 1 | 2 | —C₄H₉ | —C₄H₉ |
| 15 | 3 | 1 | 1 | H | —CH₂—CH(C₂H₅)—C₄H₉ |
| 16 | 3 | 1 | 2 | H | —CH₂—CH(C₂H₅)—C₄H₉ |
| 17 | 3 | 1 | 3 | H | —CH₂—CH(C₂H₅)—C₄H₉ |
| 18 | 3 | 1 | 4 | H | —CH₂—CH(C₂H₅)—C₄H₉ |
| 19 | 3 | 1 | 1 | H | —C₃H₆—OCH₂—CH(C₂H₅)—C₄H₉ |
| 20 | 3 | 1 | 2 | H | —C₃H₆—OCH₂—CH(C₂H₅)—C₄H₉ |
| 21 | 3 | 1 | 3 | H | —C₃H₆—OCH₂—CH(C₂H₅)—C₄H₉ |

TABLE 2

| No. of Specific examples | Number of ⬡ | Number of pyridine | n | R¹ | R² |
|---|---|---|---|---|---|
| 22 | 3 | 1 | 4 | H | —C₃H₆—OCH₂—CH(C₂H₅)—C₄H₉ |
| 23 | 3 | 1 | 3 | H | —C₂H₄OC₂H₄OC₂H₅ |
| 24 | 3 | 1 | 4 | —C₂H₅ | —C₂H₄OC₂H₅ |
| 25 | 3 | 1 | 1 | —i-C₃H₇ | —CH₂O—C₂H₄—(1,3-dioxane) |
| 26 | 3 | 1 | 3 | H | —CH(C₂H₅)—CH₂OCH₃ |

TABLE 2-continued

| No. of Specific examples | Number of (benzene) | Number of (pyridine) | n | R¹ | R² |
|---|---|---|---|---|---|
| 27 | 3 | 1 | 1 | H | —CH(C$_2$H$_5$)—CH$_2$OC$_2$H$_4$OC$_2$H$_5$ |
| 28 | 3 | 1 | 2 | H | —CH(C$_2$H$_5$)—CH$_2$OC$_2$H$_4$OC$_2$H$_5$ |
| 29 | 3 | 1 | 3 | H | —CH(C$_2$H$_5$)—CH$_2$OC$_2$H$_4$OC$_2$H$_5$ |
| 30 | 3 | 1 | 4 | H | —CH(i-C$_3$H$_7$)—COOCH$_3$ |
| 31 | 3 | 1 | 1 | H | —CH(i-C$_3$H$_7$)—COOCH$_3$ |
| 32 | 3 | 1 | 2 | H | —CH(i-C$_3$H$_7$)—COOCH$_3$ |
| 33 | 3 | 1 | 3 | H | —CH(i-C$_3$H$_7$)—COOCH$_3$ |
| 34 | 3 | 1 | 4 | H | —CH(i-C$_3$H$_7$)—COOCH$_3$ |
| 35 | 3 | 1 | 3 | —n-C$_8$H$_{17}$ | —CH(C$_2$H$_5$)—CH$_2$OC$_2$H$_4$OC$_2$H$_5$ |

TABLE 3

| No. of Specific examples | Number of (benzene) | Number of (pyridine) | n | R¹ | R² |
|---|---|---|---|---|---|
| 36 | 3 | 1 | 4 | H | —CH(COOC$_2$H$_4$OC$_2$H$_5$)—COOC$_2$H$_4$OC$_2$H$_5$ |
| 37 | 3 | 1 | 1 | —C$_2$H$_4$OC$_2$H$_4$OC$_2$H$_5$ | —C$_2$H$_4$OC$_2$H$_4$OC$_2$H$_5$ |
| 38 | 2 | 2 | 1 | H | —C$_2$H$_4$OC$_2$H$_5$ |
| 39 | 2 | 2 | 2 | H | —C$_2$H$_4$OC$_2$H$_5$ |
| 40 | 2 | 2 | 3 | H | —C$_2$H$_4$OC$_2$H$_5$ |
| 41 | 2 | 2 | 4 | H | —C$_2$H$_4$OC$_2$H$_5$ |
| 42 | 2 | 2 | 2 | —C$_2$H$_4$OC$_2$H$_5$ | —C$_2$H$_4$OC$_2$H$_5$ |
| 43 | 2 | 2 | 1 | H | —C$_3$H$_6$OC$_4$H$_9$ |
| 44 | 2 | 2 | 2 | H | —C$_3$H$_6$OC$_4$H$_9$ |
| 45 | 2 | 2 | 3 | H | —C$_3$H$_6$OC$_4$H$_9$ |

TABLE 3-continued

| No. of Specific examples | Number of ⌬ | Number of ⌬N | n | R¹ | R² |
|---|---|---|---|---|---|
| 46 | 2 | 2 | 4 | H | —C₃H₆OC₄H₉ |
| 47 | 2 | 2 | 1 | —C₂H₄OCH₃ | —C₂H₄OCH₃ |
| 48 | 2 | 2 | 2 | —C₂H₄OCH₃ | —C₂H₄OCH₃ |
| 49 | 2 | 2 | 3 | —C₂H₄OCH₃ | —C₂H₄OCH₃ |
| 50 | 2 | 2 | 4 | —C₂H₄OCH₃ | —C₂H₄OCH₃ |
| 51 | 2 | 2 | 3 | —C₄H₉ | —C₄H₉ |
| 52 | 2 | 2 | 1 | H | —CH₂—CH(C₂H₅)—C₄H₉ |
| 53 | 2 | 2 | 2 | H | —CH₂—CH(C₂H₅)—C₄H₉ |
| 54 | 2 | 2 | 3 | H | —CH₂—CH(C₂H₅)—C₄H₉ |
| 55 | 2 | 2 | 4 | H | —CH₂—CH(C₂H₅)—C₄H₉ |
| 56 | 2 | 2 | 1 | H | —C₃H₆—OCH₂—CH(C₂H₅)—C₄H₉ |

TABLE 4

| No. of Specific examples | Number of ⌬ | Number of ⌬N | n | R¹ | R² |
|---|---|---|---|---|---|
| 57 | 2 | 2 | 2 | H | —C₃H₆—OCH₂—CH(C₂H₅)—C₄H₉ |
| 58 | 2 | 2 | 3 | H | —C₃H₆—OCH₂—CH(C₂H₅)—C₄H₉ |
| 59 | 2 | 2 | 4 | H | —C₃H₆—OCH₂—CH(C₂H₅)—C₄H₉ |
| 60 | 2 | 2 | 4 | H | —C₂H₄OC₂H₄OC₂H₅ |
| 61 | 2 | 2 | 1 | —C₂H₅ | —C₂H₄OC₂H₅ |
| 62 | 2 | 2 | 2 | —i-C₃H₇ | —CH₂O—C₂H₄—(1,3-dioxane) |

TABLE 4-continued

| No. of Specific examples | Number of (benzene ring) | Number of (pyridine ring) | n | R¹ | R² |
|---|---|---|---|---|---|
| 63 | 2 | 2 | 3 | H | —CH(C$_2$H$_5$)—CH$_2$OCH$_3$ |
| 64 | 2 | 2 | 1 | H | —CH(C$_2$H$_5$)—CH$_2$OC$_2$H$_4$OC$_2$H$_5$ |
| 65 | 2 | 2 | 2 | H | —CH(C$_2$H$_5$)—CH$_2$OC$_2$H$_4$OC$_2$H$_5$ |
| 66 | 2 | 2 | 3 | H | —CH(C$_2$H$_5$)—CH$_2$OC$_2$H$_4$OC$_2$H$_5$ |
| 67 | 2 | 2 | 4 | H | —CH(C$_2$H$_5$)—CH$_2$OC$_2$H$_4$OC$_2$H$_5$ |
| 68 | 2 | 2 | 1 | H | —CH(i-C$_3$H$_7$)—COOCH$_3$ |
| 69 | 2 | 2 | 2 | H | —CH(i-C$_3$H$_7$)—COOCH$_3$ |
| 70 | 2 | 2 | 3 | H | —CH(i-C$_3$H$_7$)—COOCH$_3$ |

TABLE 5

| No. of Specific examples | Number of (benzene ring) | Number of (pyridine ring) | n | R¹ | R² |
|---|---|---|---|---|---|
| 71 | 2 | 2 | 4 | H | —CH(i-C$_3$H$_7$)—COOCH$_3$ |
| 72 | 2 | 2 | 4 | —n-C$_8$H$_{17}$ | —CH(C$_2$H$_5$)—CH$_2$OC$_2$H$_4$OC$_2$H$_5$ |
| 73 | 2 | 2 | 1 | H | —CH(COOC$_2$H$_4$OC$_2$H$_5$)—COOC$_2$H$_4$OC$_2$H$_5$ |
| 74 | 2 | 2 | 2 | —C$_2$H$_4$OC$_2$H$_4$OC$_2$H$_5$ | —C$_2$H$_4$OC$_2$H$_4$OC$_2$H$_5$ |
| 75 | 1 | 3 | 1 | H | —C$_2$H$_4$OC$_2$H$_5$ |
| 76 | 1 | 3 | 2 | H | —C$_2$H$_4$OC$_2$H$_5$ |
| 77 | 1 | 3 | 3 | H | —C$_2$H$_4$OC$_2$H$_5$ |
| 78 | 1 | 3 | 4 | H | —C$_2$H$_4$OC$_2$H$_5$ |

TABLE 5-continued

| No. of Specific examples | Number of ⌬ | Number of ⌬N | n | R¹ | R² |
|---|---|---|---|---|---|
| 79 | 1 | 3 | 3 | —$C_2H_4OC_2H_5$ | —$C_2H_4OC_2H_5$ |
| 80 | 1 | 3 | 1 | H | —$C_3H_6OC_4H_9$ |
| 81 | 1 | 3 | 2 | H | —$C_3H_6OC_4H_9$ |
| 82 | 1 | 3 | 3 | H | —$C_3H_6OC_4H_9$ |
| 83 | 1 | 3 | 4 | H | —$C_3H_6OC_4H_9$ |
| 84 | 1 | 3 | 1 | —$C_2H_4OCH_3$ | —$C_2H_4OCH_3$ |
| 85 | 1 | 3 | 2 | —$C_2H_4OCH_3$ | —$C_2H_4OCH_3$ |
| 86 | 1 | 3 | 3 | —$C_2H_4OCH_3$ | —$C_2H_4OCH_3$ |
| 87 | 1 | 3 | 4 | —$C_2H_4OCH_3$ | —$C_2H_4OCH_3$ |
| 88 | 1 | 3 | 4 | —$C_4H_9$ | —$C_4H_9$ |
| 89 | 1 | 3 | 1 | H | —$CH_2$—$CH(C_2H_5)$—$C_4H_9$ |
| 90 | 1 | 3 | 2 | H | —$CH_2$—$CH(C_2H_5)$—$C_4H_9$ |
| 91 | 1 | 3 | 3 | H | —$CH_2$—$CH(C_2H_5)$—$C_4H_9$ |

TABLE 6

| No. of Specific examples | Number of ⌬ | Number of ⌬N | n | R¹ | R² |
|---|---|---|---|---|---|
| 92 | 1 | 3 | 4 | H | —$CH_2$—$CH(C_2H_5)$—$C_4H_9$ |
| 93 | 1 | 3 | 1 | H | —$C_3H_6$—$OCH_2$—$CH(C_2H_5)$—$C_4H_9$ |
| 94 | 1 | 3 | 2 | H | —$C_3H_6$—$OCH_2$—$CH(C_2H_5)$—$C_4H_9$ |
| 95 | 1 | 3 | 3 | H | —$C_3H_6$—$OCH_2$—$CH(C_2H_5)$—$C_4H_9$ |
| 96 | 1 | 3 | 4 | H | —$C_3H_6$—$OCH_2$—$CH(C_2H_5)$—$C_4H_9$ |

TABLE 6-continued

| No. of Specific examples | Number of ⬡ | Number of ⬡N | | | |
|---|---|---|---|---|---|
| 97 | 1 | 3 | 1 | H | —C₂H₄OC₂H₄OC₂H₅ |
| 98 | 1 | 3 | 2 | —C₂H₅ | —C₂H₄OC₂H₅ |
| 99 | 1 | 3 | 3 | —i-C₃H₇ | —CH₂O—C₂H₄—[1,3-dioxane] |
| 100 | 1 | 3 | 4 | H | —CH(C₂H₅)—CH₂OCH₃ |
| 101 | 1 | 3 | 1 | H | —CH(C₂H₅)—CH₂OC₂H₄OC₂H₅ |
| 102 | 1 | 3 | 2 | H | —CH(C₂H₅)—CH₂OC₂H₄OC₂H₅ |
| 103 | 1 | 3 | 3 | H | —CH(C₂H₅)—CH₂OC₂H₄OC₂H₅ |
| 104 | 1 | 3 | 4 | H | —CH(C₂H₅)—CH₂OC₂H₄OC₂H₅ |
| 105 | 1 | 3 | 1 | H | —CH—C₂H₄COCH₃ |
| 106 | 1 | 3 | 2 | H | —CH—C₂H₄COCH₃ |
| 107 | 1 | 3 | 3 | H | —CH—C₂H₄COC₃H₇ |

TABLE 7

| No. of Specific examples | Number of ⬡ | Number of ⬡N | | | |
|---|---|---|---|---|---|
| 108 | 1 | 3 | 4 | H | —CH—C₂H₄COC₃H₇ |
| 109 | 1 | 3 | 1 | —n-C₈H₁₇ | —CH(C₂H₅)—CH₂OC₂H₄OC₂H₅ |
| 110 | 1 | 3 | 2 | H | —CH(COOC₂H₄OC₂H₅)—COOC₂H₄OC₂H₅ |
| 111 | 1 | 3 | 3 | —C₂H₄OC₂H₄OC₂H₅ | —C₂H₄OC₂H₄OC₂H₅ |
| 112 | 0 | 4 | 1 | H | —C₂H₄OC₂H₅ |
| 113 | 0 | 4 | 2 | H | —C₂H₄OC₂H₅ |

TABLE 7-continued

| No. of Specific examples | Number of (benzene) | Number of (pyridine) | | | |
|---|---|---|---|---|---|
| 114 | 0 | 4 | 3 | H | —C$_2$H$_4$OC$_2$H$_5$ |
| 115 | 0 | 4 | 4 | H | —C$_2$H$_4$OC$_2$H$_5$ |
| 116 | 0 | 4 | 4 | —C$_2$H$_4$OC$_2$H$_5$ | —C$_2$H$_4$OC$_2$H$_5$ |
| 117 | 0 | 4 | 1 | H | —C$_3$H$_6$OC$_4$H$_9$ |
| 118 | 0 | 4 | 2 | H | —C$_3$H$_6$OC$_4$H$_9$ |
| 119 | 0 | 4 | 3 | H | —C$_3$H$_6$OC$_4$H$_9$ |
| 120 | 0 | 4 | 4 | H | —C$_3$H$_6$OC$_4$H$_9$ |
| 121 | 0 | 4 | 1 | —C$_2$H$_4$OCH$_3$ | —C$_2$H$_4$OCH$_3$ |
| 122 | 0 | 4 | 2 | —C$_2$H$_4$OCH$_3$ | —C$_2$H$_4$OCH$_3$ |
| 123 | 0 | 4 | 3 | —C$_2$H$_4$OCH$_3$ | —C$_2$H$_4$OCH$_3$ |
| 124 | 0 | 4 | 4 | —C$_2$H$_4$OCH$_3$ | —C$_2$H$_4$OCH$_3$ |
| 125 | 0 | 4 | 1 | —C$_4$H$_9$ | —C$_4$H$_9$ |
| 126 | 0 | 4 | 1 | H | —CH$_2$—CH(C$_2$H$_5$)—C$_4$H$_9$ |
| 127 | 0 | 4 | 1 | H | —CH$_2$—CH(C$_2$H$_5$)—C$_4$H$_9$ |
| 128 | 0 | 4 | 3 | H | —CH$_2$—CH(C$_2$H$_5$)—C$_4$H$_9$ |
| 129 | 0 | 4 | 4 | H | —CH$_2$—CH(C$_2$H$_5$)—C$_4$H$_9$ |

TABLE 8

| No. of Specific examples | Number of (benzene) | Number of (pyridine) | | | |
|---|---|---|---|---|---|
| 130 | 0 | 4 | 1 | H | —CHCOCH$_3$ |
| 131 | 0 | 4 | 2 | H | —CHCOCH$_3$ |
| 132 | 0 | 4 | 3 | H | —CHCOOC$_3$H$_7$ |
| 133 | 0 | 4 | 4 | H | —CHCOOC$_3$H$_7$ |

TABLE 8-continued

| No. of Specific examples | Number of (benzene) | Number of (pyridine) | n | R¹ | R² |
|---|---|---|---|---|---|
| 134 | 0 | 4 | 2 | H | —$C_2H_4OC_2H_4OC_2H_5$ |
| 135 | 0 | 4 | 3 | —$C_2H_5$ | —$C_2H_4OC_2H_5$ |
| 136 | 0 | 4 | 4 | —i-$C_3H_7$ | —$CH_2O$—$C_2H_4$—(1,3-dioxane) |
| 137 | 0 | 4 | 1 | H | —CH(—$C_2H_5$)—$CH_2OCH_3$ |
| 138 | 0 | 4 | 1 | H | —CH(—$C_2H_5$)—$CH_2OC_2H_4OC_2H_5$ |
| 139 | 0 | 4 | 2 | H | —CH(—$C_2H_5$)—$CH_2OC_2H_4OC_2H_5$ |
| 140 | 0 | 4 | 3 | H | —CH(—$C_2H_5$)—$CH_2OC_2H_4OC_2H_5$ |
| 141 | 0 | 4 | 4 | H | —CH(—$C_2H_5$)—$CH_2OC_2H_4OC_2H_5$ |
| 142 | 0 | 4 | 1 | H | —CH(—i-$C_3H_7$)—$COOCH_3$ |
| 143 | 0 | 4 | 2 | H | —CH(—i-$C_3H_7$)—$COOCH_3$ |
| 144 | 0 | 4 | 3 | H | —CH(—i-$C_3H_7$)—$COOCH_3$ |
| 145 | 0 | 4 | 4 | H | —CH(—i-$C_3H_7$)—$COOCH_3$ |

TABLE 9

| No. of Specific examples | Number of (benzene) | Number of (pyridine) | n | R¹ | R² |
|---|---|---|---|---|---|
| 146 | 0 | 4 | 2 | —n-$C_8H_{17}$ | —CH(—$C_2H_5$)—$CH_2OC_2H_4OC_2H_5$ |
| 147 | 0 | 4 | 3 | H | —CH(—$COOC_2H_4OC_2H_5$)—$COOC_2H_4OC_2H_5$ |
| 148 | 0 | 4 | 4 | —$C_2H_4OC_2H_4OC_2H_5$ | —$C_2H_4OC_2H_4OC_2H_5$ |

Production Method of azaporphyrin Compound

The method for producing the azaporphyrin compound of the invention will be described below.

Outline of the representative method for producing the azaporphyrin compound of the invention is as follows:

(1) a basic frame of the azaporphyrin compound is produced by allowing a mixture of phthalic acid (may be substituted) and pyridine-2,3-dicarboxylic acid (may be substituted) to react (azaporphyrin ring forming step);

(2) the reaction product is chlorosulfonylated to obtain a chlorosulfonyl compound of azaporphyrin (chlorosulfonylation step); and (3) the desired compound is obtained by amidation of the chlorosulfonylated compound of azaporphyrin allowing it to react with an amine(sulfoamidation step).

The production method will be described in more detail below.

(1) Azaporphyrin ring forming step

An example for forming the azaporphyrin ring is a ring forming method that is to heat a mixture of phthalic acid; and pyridine-2,3-dicarboxylic acid, a metal powder and a metal oxide or metal salt at 120 to 300° C. in the presence of ammonia gas or urea using ammonium molybdate as a catalyst without using any solvents or in a solvent such as tetralin, 1-chloronaphthaline, nitrobenzene, trichlorobenzene or DMI.

The proportion of mixing between phthalic acid and pyridine-2,3-dicarboxylic acid in the ring forming reaction above is preferably 3.99:0.01 to 0:4, more preferably 3:1 to 0:4, in molar ratio.

Dicyano substituents or acid anhydrides of phthalic acid and pyridine-2,3-dicarboxylic acid may be used in place of phthalic acid and pyridine-2,3-dicarboxylic acid. These dicarboxylic acids and acid anhydrides may comprise halogen atoms, alkyl groups, alkoxy groups or nitro groups as substituents.

(2) Chlorosulfonylation Step

The azaporphyrin compound obtained in the azaporphyrin ring forming step is added into 5 to 20 times mass of chlorosulfonic acid in small portions so as to maintain a temperature of not higher than 20° C. After stirring the mixture for about 1 hour at the same temperature, the mixture is allowed to react at 130 to 135° C. for 4 hours. The reaction mixture is cooled to about 80° C., and thionyl chloride with 2 to 5 times mass of the azaporphyrin compound is added dropwise in 1 to 2 hours while the temperature is kept at 70 to 80° C. After stirring the mixture for 2 to 10 hours at the same temperature, it is cooled to 15 to 20° C. followed by stirring for about 12 hours at the same temperature. This reaction solution is discharged in small portions in ice water with a mass 50 to 200 times of the mass of chlorosulfonic acid used, and the precipitate is filtered off. The precipitate is washed with ice water until the filtrate is neutralized to obtain sulfonyl chloride of the azaporphyrin compound.

While the reaction condition above is mainly provided for obtaining the sulfonyl chloride compound, a milder reaction condition in chlorosulfonic acid enables mono-, di- or tri-substituted sulfonyl chloride compounds to be obtained. This condition is achieved by reducing the reaction temperature or by shortening the reaction time.

(3) Sulfoamidation Step

The sulfonyl chloride compound of the azaporphyrin compound obtained above is suspended in ice water, and an organic amine compound is added dropwise therein while maintaining the reaction temperature at not higher than 15° C. After the dropwise addition, the reaction solution is stirred at 20 to 30° C. for 15 to 24 hours. The desired azaporphyrin sulfonic acid amide compound is obtained after filtration, washing with water and drying.

(Known Dyes)

The azaporphyrin compounds represented by formula (1) may be used, alone or in combination with a plurality of them, as the dye in the dye-containing curable composition of the invention. Known dyes may be used together with the azaporphyrin compound represented by formula (1).

The known dyes are not particularly restricted so long as they are soluble in organic solvents, and are appropriately selected depending on the required spectroscopic absorption. Examples of the dye include acid dyes, basic dyes, disperse dyes, reaction products of acid dyes and basic compounds and reaction products of basic dyes and acid compounds that are solubilized in organic solvents. Other oil-soluble dyes may be favorably selected from the dyes described as C.I. solvent Dyes.

These dyes are required to have desirable spectra as color filters, to be soluble in a high concentration in the solvents described hereinafter or in a solution containing the alkali-soluble resin, and not to cause precipitation and aggregation with time. These dyes can be appropriately selected from C.I. solvent colors described in the color index within a range not impairing the effect of the invention. Dyes being compatible between solubility in a solvent and spectrum may be selected from oil-soluble dyes, acid dyes, disperse dyes, reactive dyes and direct dyes. Solubility of the dye in the organic solvent refers to solubility of the dye in a solvent with a percentage of no less than 1%.

The content of the dye represented by formula (1) (and known dyes, if necessary) in the dye-containing curable composition is preferably 1 to 80% by mass, more preferably 3 to 50% by mass, and particularly 5 to 30% by mass, relative to the total solid fraction (mass) of the dye-containing curable composition of the invention. The smaller ratio of the dye is preferable in view of sensitivity and developablity when the spectroscopic characteristics are satisfied.

Components (A), and (C) to (F), and other components will be described in detail hereinafter.

(A) Alkali Soluble Resin

The alkali soluble resin is preferably a linear organic polymer that is soluble in an organic solvent and developable with a weak alkali aqueous solution. Examples of the linear organic polymer include a polymer having a carboxylic acid on a side chain, such as a methacrylic acid copolymer, an acrylic acid copolymer, an itaconic acid copolymer, a crotonic acid copolymer, a maleic acid copolymer and a partially esterified maleic acid copolymer, described, for example, in JP-A No. 59-44615, JP-B Nos. 54-34327, 58-12577 and 54-25957, and JP-A Nos. 59-53836 and 59-71048, and also, an acidic cellulose derivative having a carboxylic acid on a side chain is useful.

In addition to the foregoing, a polymer obtained by adding an acid anhydride to a polymer having a hydroxyl group, a polyhydroxystyrene resin, a polysiloxane resin, poly(2-hydroxyethyl (meth)acrylate), polyvinylpyrrolidone, polyethyleneoxide and polyvinyl alcohol are also useful.

A monomer having a hydrophilic group may be copolymerized, and examples thereof include alkoxyalkyl (meth)acrylate, hydroxyalkyl (meth)acrylate, glycerol (meth)acrylate, (meth)acrylamide, N-methylolacrylamide, secondary or tertiary alkylacrylamide, dialkylaminoalkyl (meth)acrylate, morpholine (meth)acrylate, N-vinylpyrrolidone, N-vinylcaprolactam, vinylimidazole, vinyltriazole, methyl (meth)acrylate, ethyl (meth)acrylate, branched or linear propyl (meth)acrylate, branched or linear butyl (meth)acrylate and phenoxyhydroxypropyl (meth)acrylate.

Furthermore, a monomer having a tetrahydrofurfuryl group, phosphoric acid, a phosphate ester, a quaternary ammonium salt, an ethyleneoxy chain, a propyleneoxy chain, sulfonic acid or a salt thereof, or a morpholinoethyl group is also useful as the monomer having a hydrophilic group.

A polymerizable group may be present on the side chain thereof for improving the crosslinking efficiency, and a polymer having an allyl group, a (meth)acryl group or an allyloxyalkyl group is also useful. In order to improve the strength of the cured film, alcohol soluble nylon and a polyether of 2,2-bis(4-hydroxyphenyl)propane and epichlorohydrin are useful.

Among these various kinds of alkali soluble resins, a polyhydroxystyrene resin, a polysiloxane resin, an acrylic resin, an acrylamide resin and an acrylic-acrylamide copolymer resin are preferred from the standpoint of heat resistance, and an acrylic resin, an acrylamide resin and an acrylic/acrylamide copolymer resin are preferred from the standpoint of controllability of developing property.

Examples of the acrylic resin include a copolymer of a monomer selected from benzyl (meth)acrylate, (meth)acrylic acid, hydroxyethyl (meth)acrylate, (meth)acrylamide and ally (meth)acrylate.

An alkali soluble phenol resin is also useful. Examples of an alkali soluble resin having a phenolic hydroxyl group include a polyhydroxystyrene resin. Specific examples thereof include a p-hydroxystyrene resin, a m-hydroxystyrene resin, an o-hydroxystyrene resin, a copolymer thereof, a copolymer of hydroxystyrene and styrene, a copolymer of hydroxystyrene and acetoxystyrene, and a copolymer of hydroxystyrene and the aforementioned (meth)acrylic monomer.

A novolak resin and a vinyl polymer are also exemplified.

Examples of the novolak resin include those obtained by condensing a phenol compound and an aldehyde compound in the presence of an acid catalyst. Examples of the phenol compound include phenol, cresol, ethylphenol, propylphenol, butylphenol, xylenol, phenylphenol, catechol, resorcinol, pyrogallol, naphthol and bisphenol A. These phenol compounds may be used solely or in combination of two or more kinds of them. Examples of the aldehyde compound include formaldehyde, paraformaldehyde, acetaldehyde, propionaldehyde and benzaldehyde.

Specific examples of the novolak resin include a condensed product of m-cresol, p-cresol or a mixture thereof with formalin.

The alkali soluble resin is preferably a polymer having a number average molecular weight Mn (polystyrene conversion value measured with GPC) of 1,000 to $2 \times 10^5$, more preferably a polymer having Mn of 2,000 to $1 \times 10^5$, and particularly preferably a polymer having Mn of 4,000 to $5 \times 10^4$.

The molecular weight distribution (weight average molecular weight Mw/number average molecular weight Mn) of the alkali soluble resin is preferably from 1.6 to 1.05, and more preferably from 1.4 to 1.1 for maintaining a rectangular shape of an image profile after development. In order to obtain a molecular weight distribution in the aforementioned range, it is preferred that a resin having a narrow molecular weight distribution is directly obtained by a known polymerization method (such as a living anion polymerization, a living cation polymerization and a living radical polymerization), and such a method may also be applied as a solvent fractionation method (a resin is dissolved in a good solvent and then mixed with a poor solvent to deposit only a high molecular weight component, so as to obtain a resin having a narrow molecular weight distribution), a molecular weight fractionation method using column chromatography, and a fractionation method using a supercritical fluid.

The content of the alkali soluble resin in the dye-containing curable resin is preferably from 10 to 90% by mass, more preferably from 20 to 80% by mass, and particularly preferably from 30 to 70% by mass, based on the total solid content (by mass) of the composition.

(C) Photosensitive Compound

The photosensitive compound in the invention is preferably a naphthoquinonediazide compound in the case where the dye-containing curable composition is constituted as a positive type, and is preferably a photopolymerization initiator in the case where the composition is constituted as a negative type.

(Naphthoquinonediazide Compound)

In the case where a positive dye-containing curable composition, a naphthoquinonediazide compound sensitive to g-line and i-line used as a photoresist for a semiconductor is preferred. Examples of the naphthoquinonediazide compound include o-naphthoquinonediazide-5-sulfonic acid ester, o-naphthoquinonediazide-5-sulfonic acid amide, o-naphthoquinonediazide-4-sulfonic acid ester and o-naphthoquinonediazide-4-sulfonic acid amide. These esters and amides can be produced, for example, by using a phenol compound described as the general formula (I) in JP-A Nos. 2-84650 and 3-49437.

The phenol compound preferably has at least two, more preferably three or more, phenolic hydroxyl groups in one molecule from the standpoint of fulfillment of sufficient resistance to an alkali developer before exposure and high developing property after exposure. Furthermore, it is preferred for improvement in sensitivity and solubility in solvents that all the hydroxyl groups in the molecule are not converted to naphthoquinonediazide sulfonic acid esters, but a part of the hydroxyl groups are left as it is.

The alkali soluble resin and the naphthoquinonediazide compound are generally dissolved in a solvent in a proportion of 2 to 35% by mass based on the mass of the solvent.

(Photopolymerization Initiator)

In the case where a negative dye-containing curable composition is constituted, a photopolymerization initiator is an essential component. The polymerization initiator may also be further added to the positive type containing the naphthoquinonediazide compound, and in this case, the curing degree of a pattern thus formed can be accelerated after the formation of the pattern.

The photopolymerization initiator is not particularly limited as far as it can initiate a crosslinking reaction of a crosslinking agent or a polymerization reaction through exposure, and is preferably selected from the standpoint of characteristics, initiation efficiency, absorption wavelength, availability, cost and safety. Examples thereof include at least one active halogen compound selected from a halomethyloxadiazole compound and a halomethyl-s-triazine compound, a 3-aryl-substituted coumarin compound, a lophine dimer, a benzophenone compound, an acetophenone compound and a derivative thereof, a cyclopentadiene-benzene-iron complex and a salt thereof, and an oxime compound.

Examples of the active halogen compound as the halomethyloxadiazole compound include 2-halomethyl-5-vinyl-1, 3,4-oxadiazole compound described in JP-B No. 57-6096, 2-trichloromethyl-5-styryl-1,3,4-oxadiazole, 2-trichloromethyl-5-(p-cyanostyryl)-1,3,4-oxadiazole and 2-trichloromethyl-5-(p-methoxystyryl)-1,3,4-oxadiazole.

Examples of the active halogen compound as the halomethyl-s-triazine compound include a vinylhalomethyl-s-triazine compound described in JP-B No. 59-1281, and a 2-(naphtho-1-yl)-4,6-bishalomethyl-s-triazine compound and a 4-(p-aminophenyl)-2,6-dihalomethyl-s-triazine compound described in JP-A No. 53-133428.

Specific examples thereof include 2,4-bis(trichloromethyl)-6-p-methoxystyryl-s-triazine, 2,6-bis(trichloromethyl)-4-(3,4-methylenedioxyphenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphtho-1-yl)-4,6-bistrichloromethyl-s-triazine, 2-(4-methoxynaphto-1-yl)-4,6-bistrichloromethyl-s-triazine, 2-(4-ethoxynaphto-1-yl)-4,6-bistrichloromethyl-s-triazine, 2-(4-butoxynaphto-1-yl)-4,6-bistrichloromethyl-s-triazine, 2-(4-(2-methoxyethyl)-naphto-1-yl)-4,6-bistrichloromethyl-s-triazine, 2-(4-(2-ethoxyethyl)-naphtho-1-yl)-4,6-bistrichloromethyl-s-triazine, 2-(4-(2-butoxyethyl)-naphtho-1-yl)-4,6-bistrichloromethyl-s-triazine, 2-(2-methoxynaphtho-2-yl)-4,6-bistrichloromethyl-s-triazine, 2-(6-methoxy-5-methylnaphtho-2-yl)-4,6-bistrichloromethyl-s-triazine, 2-(6-methoxynaphtho-2-yl)-4,6-bistrichloromethyl-s-triazine, 2-(5-methoxynaphtho-1-yl)-4,6-bistrichloromethyl-s-triazine, 2-(4,7-dimethoxynaphto-1-yl)-4,6-bistrichloromethyl-s-triazine, 2-(6-ethoxynaphtho-2-yl)-4,6-bistrichloromethyl-s-triazine, 2-(4,5-dimethoxynaphto-1-yl)-4,6-bistrichloromethyl-s-triazine, 4-(p-N,N-di(ethoxycarbonylmethyl)aminophenyl)-2,6-di(trichloromethyl)-s-triazine, 4-(o-methyl-p-N,N-di(ethoxycarbonylmethyl)aminophenyl)-2,6-di(trichloromethyl)-s-triazine, 4-(p-N,N-di(chloroethyl)aminophenyl)-2,6-di(trichloromethyl)-s-triazine, 4-(o-methyl-p-N,N-di(chloroethyl)aminophenyl)-2,6-di(trichloromethyl)-s-triazine, 4-(p-N-chloroethylaminophenyl)-2,6-di(trichloromethyl)-s-triazine, 4-(p-N-ethoxycabonylmethylaminophenyl)-2,6-di(trichloromethyl)-s-triazine, 4-(p-N,N-di(phenyl)aminophenyl)-2,6-di(trichloroemthyl)-s-triazine, 4-(p-N-chloroethylcarbonylaminophenyl)-2,6-di(trichloromethyl)-s-triazine, 4-(p-N-(p-methoxyphenyl)carbonylaminophenyl)-2,6-di(trichloromethyl)-s-triazine, 4-(m-N,N-di(ethoxycarbonylmethyl)aminophenyl)-2,6-di(trichloromethyl)-s-triazine, 4-(m-bromo-p-N,N-di(ethoxycarbonylmethyl)aminophenyl)-2,6-di(trichloromethyl)-s-triazine, 4-(m-chloro-p-N, N-di(ethoxycarbonylmethyl)aminophenyl)-2,6-di(trichloromethyl)-s-triazine, 4-(m-fluoro-p-N,N-di(ethoxycarbonylmethyl)aminophenyl)-2,6-di(trichloromethyl)-s-triazine, 4-(o-bromo-p-N, N-di(ethoxycarbonylmethyl)aminophenyl)-2,6-di(trichloromethyl)-s-triazine, 4-(o-chloro-p-N,N-di(ethoxycarbonylmethyl)aminophenyl)-2,6-di(trichloromethyl)-s-triazine, 4-(o-fluoro-p-N,N-di(ethoxycarbonylmethyl)aminophenyl-2,6-di(trichloromethyl)-s-triazine, 4-(o-bromo-p-N,N-di(chloroethyl)aminophenyl-2,6-di(trichloromethyl)-s-triazine, 4-(o-chloro-p-N,N-di(chloroethyl)aminophenyl)-2,6-di(trichloromethyl)-s-triazine, 4-(o-fluoro-p-N,N-di(chloroethyl)aminophenyl)-2,6-di(trichloromethyl)-s-triazine, 4-(m-bromo-p-N,N-di(chloroethyl)aminophenyl)-2,6-di(trichloromethyl)-s-triazine, 4-(m-chloro-p-N,N-di(chloroethyl)aminophenyl)-2,6-di(trichloromethyl)-s-triazine, 4-(m-fluoro-p-N,N-di(chloroethyl)aminophenyl)-2,6-di(trichloromethyl)-s-triazine, 4-(m-bromo-p-N-ethoxycarbonylmethylaminophenyl)-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N-ethoxycarbonylmethylaminophenyl)-2,6-di(trichloromethyl)-s-triazine, 4-(o-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine and 4-(o-fluoro-p-N-chloroethylaminophenyl)-2,6-di(trichloromethyl)-s-triazine.

Also usefully used include TAZ series (such as TAZ-104, TAZ-107, TAZ-109, TAZ-110, TAZ-113, TAZ-123, TAZ-140 and TAZ-204), produced by Midori Kagaku Co., Ltd., T series (such as T-OMS, T-BMP, T-R and T-B), produced by PANCHIM, Inc., IRGACURE series (such as IRGACURE 149, IRGACURE 184, IRGACURE 261, IRGACURE 500, IRGACURE 651, IRGACURE 819 and IRGACURE 1000) and DAROCURE series (such as DAROCURE 1173), produced by Ciba-Geigy Ltd., 4,4'-bis(diethylamino)-benzophenone, 2-(O-benzoyloxime)-1-(4-(phenylthio) phenyl)-1,2-octadione, 2-benzyl-2-dimethylamino-4-morpholinobutylophenone, 2,2-dimethoxy-2-phenylacetophenone, a 2-(o-chlorophenyl)-4,5-diphenylimidazolyl dimer, a 2-(o-fluorophenyl)-4,5-diphenylimidazolyl dimer, a 2-(o-methoxyphenyl)-4,5-diphenylimidazolyl dimer, a 2-(p-methoxyphenyl)-4,5-diphenylimidazolyl dimer, a 2-(p-dimethoxyphenyl)-4,5-diphenylimidazolyl dimer, a 2-(2,4-dimethoxyphenyl)-4,5-diphenylimidazolyl dimer, a 2-(p-methylmercaptophenyl)-4,5-diphenylimidazolyl dimer and benzoin isopropyl ether.

The photopolymerization initiator may be used in combination with a sensitizer and a photostabilizer.

Examples thereof include benzoin, benzoin methyl ether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, 2-ethoxyxanthone, thioxanthone, 2,4-diethylthioxanthone, acridone, 10-butyl-2-chloroacridone, benzyl, dibenzylacetone, p-(dimethylamino) phenyl styryl ketone, p-(dimethylamino) phenyl-p-methyl styryl ketone, benzophenone, p-(dimethylamino)benzophenone (or Michler's ketone), p-(diethylamino)benzophenone, benzoanthrone, a benzothiazole compound described in JP-B No. 51-48516, and TINUVIN 1130 and TINUVIN 400.

In the dye-containing curable composition of the invention, another known initiator may be contained in addition to the aforementioned photopolymerization initiator. Specific examples thereof include a vicinal polyketaldonyl compound described in U.S. Pat. No. 2,367,660, α-carbonyl compounds described in U.S. Pat. Nos. 2,367,661 and 2,367,670, an acyloin ether described in U.S. Pat. No.2,448,828, an aromatic acyloin compound substituted with an α-hydrocarbon described in U.S. Pat. No. 2,722,512, a multinuclear quinone compound described in U.S. Pat. No. 2,951,758, a combination of a triallylimidazole dimer and p-aminophenyl ketone described in U.S. Pat. No. 3,549,367, and a benzothiazole compound and a trihalomethyl-s-triazine compound described in JP-B No. 51-48516.

The total content of the photopolymerization initiator (and the known initiator) is preferably from 0.01 to 50% by mass, more preferably from 1 to 30% by mass, and particularly preferably from 1 to 20% by mass, based on the solid content (by mass) of the polymerizable monomer components (for example, a polymerizable monomer compound indicated as a crosslinking agent described later). If the total content thereof is less than 0.01% by mass, the polymerization may be difficult to proceed, and if it exceeds 50% by mass, the molecular weight may become small to reduce the film strength although the polymerization rate is large.

(D) Solvent

Upon preparation of the dye-containing curable composition of the invention, a solvent is generally used. The solvent is not particularly limited as far as it satisfies solubility to the respective components and coating property of the dye-containing curable composition, and it is preferably selected under particular consideration of the solubility of the alkali soluble resin, the coating property and the safety.

Preferred examples of the solvent include an ester compound, such as an alkyl ester, e.g., ethyl acetate, n-butyl acetate, isobutyl acetate, amyl formate, isoamyl acetate, isobutyl acetate, butyl propionate, isopropyl butyrate, ethyl butyrate, butyl butyrate, an alkyl ester compound, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate and ethyl ethoxyacetate; a 3-oxypropionic acid alkyl ester, such as methyl 3-oxypropionate and ethyl 3-oxypropionate, for example, methyl 3-methoxypropionate, ethyl 3-methoxypropionate, methyl 3-ethoxypropionate and ethyl 3-ethoxypropionate, a 2-oxypropionic acid alkyl ester, such as methyl 2-oxypropionate, ethyl 2-oxypropionate and propyl 2-oxypropionate, for example, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate and ethyl 2-ethoxy-2-methylpropionate, methyl pyruvate, ethyl pyruvate, propyl pyruvate, methyl acetoacetate, ethyl acetoacetate, methyl 2-oxobutanoate and ethyl 2-oxobutanoate; an ether compound, such as diethylene glycol dimethyl ether, tetrahydrofuran, ethylene glycol monomethyl ether, ethylene glycol monoethyl ether, methylcellosolve acetate, ethylcellosolve acetate, diethylene glycol monomethyl ether, diethylene glycol monoethyl ether, diethylene glycol monobutyl ether, propylene glycol methyl ether, propylene glycol methyl ether acetate, propylene glycol ethyl ether acetate, propylene glycol propyl ether acetate, ethylcarbitol acetate and butylcarbitol acetate; a ketone compound, such as methyl ethyl ketone, cyclohexanone, 2-heptanone and 3-heptanone, and an aromatic hydrocarbon compound, such as toluene and xylene.

Among these, methyl 3-ethoxypropionate, ethyl 3-ethoxypropionate, ethylcellosolve acetate, ethyl lactate, diethylene glycol dimethyl ether, butyl acetate, methyl 3-methoxypropionate, 2-heptanone, cyclohexanone, ethylcarbitol acetate, butylcarbitol acetate, propylene glycol methyl ether and propylene glycol methyl ether acetate are more preferred.

Two or more kinds of the solvents may be mixed from the standpoint of solubility of the dye and the alkali soluble resin and improvement of the surface property of the coated film, and in particular, such a mixed solvent is preferably used that is constituted with two or more kinds selected from methyl 3-ethoxypropionate, ethyl 3-ethoxypropionate, ethylcellosolve acetate, ethyl lactate, diethylene glycol dimethyl ether, butyl acetate, methyl 3-methoxypropionate, 2-heptanone, cyclohexanone, ethylcarbitol acetate, butylcarbitol acetate, propylene glycol methyl ether and propylene glycol methyl ether acetate.

(E) Crosslinking Agent

The crosslinking agent is activated with an acid or a radical generated from the photopolymerization initiator through irradiation of light or a radiation ray, whereby crosslinking is formed by reacting with the alkali soluble resin, or crosslinking is formed by bonding or polymerization of the crosslinking agent itself, and thus, the solubility of the alkali developer in an exposed area is lowered to form an image. Furthermore, the crosslinking agent is effective for sufficient curing of a pattern by heating after forming an image depending on necessity.

Therefore, the crosslinking agent used in the invention is not particularly limited as far as it is capable of exerting film curing through crosslinking and polymerization, and examples thereof include (a) an epoxy resin, (b) a melamine compound, a guanamine compound, a glycoluril compound or an urea compound having been substituted with at least one substituent selected from a methylol group, an alkoxymethyl group and an acyloxymethyl group, (c) a phenol compound, a naphthol compound or a hydroxyanthracene compound having been substituted with at least one substituent selected from a methylol group, an alkoxymethyl group and an acyloxymethyl group, and (d) a polymerizable monomer compound.

The epoxy resin (a) may be any compound that has an epoxy group and crosslinking property, and examples thereof include a divalent glycidyl group-containing low molecular weight compound, such as bisphenol A glycidyl ether, ethylene glycol diglycidyl ether, butanediol diglycidyl ether, hexanediol diglycidyl ether, dihydroxybiphenyl diglycidyl ether, diglycidyl phthalate and N,N-diglycidylaniline, a trivalent glycidyl group-containing low molecular weight compound, such as trimethylolpropane triglycidyl ether, trimethylolphenol triglycidyl ether and TrisP-PA (trisphenol P-PA) triglycidyl ether, a tetravalent glycidyl group-containing low molecular weight compound, such as pentaerythritol tetraglycidyl ether and tetramethylolbisphenol A tetraglycidyl ether, a polyvalent glycidyl group-containing low molecular weight compound, such as dipentaerythritol pentaglycidyl ether and dipentaerythritol hexaglycidyl ether, and a glycidyl group-containing polymer compound, such as polyglycidyl (meth)acrylate and a 1,2-epoxy-4-(2-oxiranyl)cyclohexane adduct of 2,2-bis(hydroxymethyl)-1-butanol.

The number of a methylol group, an alkoxymethyl group and an acyloxymethyl group contained in and substituted on the crosslinking agent (b) is generally from 2 to 6 in the case of the melamine compound and from 2 to 4 in the case of the glycoluril compound, the guanamine compound and the urea compound, and is preferably from 5 to 6 in the case of the melamine compound and from 3 to 4 in the case of the glycoluril compound, the guanamine compound and the urea compound.

The melamine compound, the guanamine compound, the glycoluril compound and the urea compound (b) are referred to as a compound (a methylol group-containing compound, an alkoxymethyl group-containing compound or an acyloxymethyl group-containing compound) of the category (b).

The methylol group-containing compound of the category (b) can be obtained by heating an alkoxymethyl group-containing compound in an alcohol in the presence of an acid catalyst, such as hydrochloric acid, sulfuric acid, nitric acid and methanesulfonic acid. The acyloxymethyl group-containing compound of the category (b) can be obtained by mixing and stirring a methylol group-containing compound with an acyl chloride in the presence of a basic catalyst.

Specific examples of the compounds of the category (b) having the aforementioned substituent are shown below.

Examples of the melamine compound include hexamethylolmelamine, hexamethoxymethylmelamine, a compound obtained by methoxymethylating from 1 to 5 methylol groups of hexamethylolmelamine or a mixture thereof, hexamethoxyethylmelamine, hexaacyloxymethylmelamine, and a compound obtained by acyloxymethlating from 1 to 5 methylol groups of hexamethylolmelamine or a mixture thereof.

Examples of the guanamine compound include tetramethylolguanamine, tetramethoxymethylguanamine, a compound obtained by methoxymethylating from 1 to 3 methylol groups of tetramethylolguanamine or a mixture thereof, tetramethoxyethylguanamine, tetraacyloxymethylguanamine, and a compound obtained by acyloxymethylating from 1 to 3 methylol groups of tetramethylolguanamine or a mixture thereof.

Examples of the glycoluril compound include tetramethylolglycoluril, tetramethoxymethylglycoluril, a compound obtained by methoxymethylating from 1 to 3 methylol groups of tetramethylolglycoluril or a mixture thereof, and a compound obtained by acyloxymethylating from 1 to 3 methylol groups of tetramethylolglycoluril or a mixture thereof.

Examples of the urea compound include tetramethylolurea, tetramethoxymethylurea, a compound obtained by methoxymethylating from 1 to 3 methylol groups of tetramethylolurea or a mixture thereof, and tetramethoxyethylurea.

The compounds of the category (b) may be used solely or in combination thereof.

The crosslinking agent (c), i.e., a phenol compound, a naphthol compound or a hydroxyanthracene compound having been substituted with at least one substituent selected from a methylol group, an alkoxymethyl group and an acyloxymethyl group, exerts thermal crosslinking as similar to the crosslinking agent (b), so as to suppress intermixing with a photoresist as an upper layer and to improve the film strength. These compounds are sometimes referred to as a compound of the category (c) (a methylol group-containing compound, an alkoxymethyl group-containing compound or an acyloxymethyl group-containing compound).

The number of a methylol group, an alkoxymethyl group and an acyloxymethyl group contained in the crosslinking agent (c) is necessarily at least 2 per one molecule, and a compound having a phenol compound skeleton, all the 2-position and the 4-position of which have been substituted, is preferred from the standpoint of thermal crosslinking property and storage stability. Furthermore, a compound having a naphthol compound skeleton or a hydroxyanthracene compound skeleton, all the o-positions and the p-positions of which with respect to the hydroxyl group have been substituted, is also preferred. The 3-position or the 5-position of the phenol compound may either be unsubstituted or have a substituent, and in the naphthol compound, other positions than the o-positions with respect to the hydroxyl group may either be unsubstituted or have a substituent.

The methylol group-containing compound of the category (c) can be obtained by using a phenolic hydroxyl group-containing compound whose 2- or 4-position of the phenolic hydroxyl group is a hydrogen atom as a raw material and reacting it with formalin in the presence of a basic catalyst, such as sodium hydroxide, potassium hydroxide, ammonia and tetraalkylammonium hydroxide. The alkoxymethyl group-containing compound of the category (c) can be obtained by heating the methylol group-containing compound of the category (c) in an alcohol in the presence of an acid catalyst, such as hydrochloric acid, sulfuric acid, nitric acid and methanesulfonic acid. The acyloxymethyl group-containing compound of the category (c) can be obtained by reacting the methylol group-containing compound of the category (c) with an acyl chloride in the presence of a basic catalyst.

Examples of the skeleton compound of the crosslinking agent (c) include a phenol compound, a naphthol compound and a hydroxyanthracene compound, in which the o-positions and the p-positions of the phenolic hydroxyl group are unsubstituted, and examples thereof include phenol, isomers of cresol, 2,3-xylenol, 2,5-xylenol, 3,4-xylenol, 3,5-xylenol, a bisphenol compound, such as bisphenol A, 4,4'-bishydroxybiphenyl, TrisP-PA (produced by Honshu Chemical Industry Co., Ltd.), naphthol, dihydroxynaphthalene and 2,7-dihydroxyanthracene.

As specific examples of the crosslinking agent (c), examples of the phenol compound include trimethylolphenol, tri(methoxymethyl)phenol, a compound obtained by methoxymethylating from 1 to 2 methylol groups of trimethylolphenol, trimethylol-3-cresol, tri(methoxymethyl)-3-cresol, a compound obtained by methoxymethylating from 1 to 2 methylol groups of trimethylol-3-cresol, a dimethylolcresol, such as 2,6-dimethylol-4-cresol, tetramethylolbisophenol A, tetramethoxymethylbisphenol A, a compound obtained by methoxymethlating from 1 to 3 methylol groups of tetramethylolbisphenol A, tetramethylol-4,4'-bishydroxybiphenyl, tetramethoxymethyl-4,4'-bishydroxybiphenyl, a hexamethylol compound of TrisP-PA, a hexamethoxymethyl compound of TrisP-PA, a compound obtained by methoxymethylating from 1 to 5 methylol groups of a hexamethylol compound of TrisP-PA, and bishydroxymethylnaphthalenediol.

Examples of the hydroxyanthracene compound include 1,6-dihydroxymethyl-2,7-dihydroxyanthracene, and examples of the acyloxymethyl group-containing compound include compounds obtained by acyloxymethylating a part or all of the methylol groups of the methylol group-containing compounds.

Preferred examples among these compounds include trimethylolphenol, bishydroxymethyl-p-cresol, tetramethylolbisphenol A, a hexamethylol compound of TrisP-PA (produced by Honshu Chemical Industry Co., Ltd.), and phenol compounds obtained by substituting the methylol groups of these compounds with an alkoxymethyl group and both a methylol group and an alkoxymethyl group.

The compound of the category (c) may be used solely or in combination thereof.

The polymerizable monomer (d) will be described below. As the polymerizable monomer, such a compound is preferred that has at least one addition-polymerizable ethylene group and has a boiling point of 100° C. or more under ordinary pressure and an ethylenic unsaturated group.

Examples thereof include a monofunctional acrylate or methacrylate, such as polyethylene glycol mono(meth)acrylate, polypropylene glycol mono(meth)acrylate and phenoxyethyl (meth)acrylate, and a polyfunctional acrylate or methacrylate, such as polyethylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)

acrylate, hexanediol (meth)acrylate, trimethylolpropane tri(acryloyloxypropyl) ether, tri(acryloyloxyethyl) isocyanurate, a compound obtained by adding ethylene oxide or propylene oxide to a polyhydric alcohol, such as glycerin and trimethylolethane, and then converted to a (meth)acrylate, urethane acrylate compounds described in JP-B Nos. 48-41708 and 50-6034 and JP-A No. 51-37193, polyester acrylate compounds described in JP-A No. 48-64183 and JP-B Nos. 49-43191 and 52-30490, and an epoxy acrylate compound, which is a reaction product of an epoxy resin and (meth)acrylic acid. Examples thereof further include compounds indicated as a photocurable monomer and oligomer in Journal of Adhesion Society of Japan, Vol. 20, No. 7, p. 300 to 308.

The total content of the crosslinking agents (a) to (d) in the dye-containing curable composition is, while it varies depending on the material thereof, preferably from 1 to 70% by mass, more preferably from 5 to 50% by mass, and particularly preferably from 7 to 30% by mass, based on the solid content of the composition.

(F) Other Components (Thermal Polymerization Inhibitor)

A thermal polymerization inhibitor is preferably contained in the dye-containing curable composition of the invention in addition to the aforementioned components. Examples thereof include hydroquinone, p-methoxypehnol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol) and 2-mercaptobeozimidazole.

(Various Kinds of Additives)

Various kinds of additives may be added to the dye-containing curable composition of the invention depending on necessity, such as a filler, a polymer compound other than those described in the foregoing, a surfactant, an adhesion accelerating agent, an antioxidant, an ultraviolet ray absorbing agent and an aggregation preventing agent. Furthermore, a discoloration preventing agent for the dye may also be added depending on necessity.

Examples of the additives include a filler, such as glass and alumina; a polymer compound other than the binder resin, such as polyvinyl alcohol, polyacrylic acid, polyethylene glycol monoalkyl ether and polyfluoroalkyl acrylate; a surfactant, such as a nonionic surfactant, a cationic surfactant and an anionic surfactant; an adhesion accelerating agent, such as vinyltrimethoxysilane, vinyltriethoxysilane, vinyltris(2-methoxyethoxy)silane, N-(2-amonoethyl)-3-aminopropyldimethylmethoxysilane, N-(2-aminoethyl)-3-aminopropyltrimethyoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane and 3-mercaptopropyltrimethoxysilane; an antioxidant, such as 2,2-thiobis(4-methyl-6-t-butylphenol) and 2,6-di-t-butylphenol; an ultraviolet ray absorbing agent, such as 2-(3-t-butyl-5-methyl-2-hydroxyphenyl)-5-chlorobenzotriazole and alkoxybenzophenone; and an aggregation preventing agent, such as sodium polyacrylate.

In order to accelerate the dissolution of the non-image area to an alkali solution to attain further improvement of the developing property of the dye-containing curable composition of the invention, an organic carboxylic acid, preferably a low molecular weight organic carboxylic acid having a molecular weight of 1,000 or less, may be added to the composition.

Specific examples thereof include an aliphatic monocarboxylic acid, such as formic acid, acetic acid, propionic acid, butyric acid, valeric acid, pivalic acid, caproic acid, diethylacetic acid, enanthic acid and caprylic acid; an aliphatic dicarboxylic acid, such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid and citraconic acid; an aliphatic tricarboxylic acid, such as tricarballylic acid, aconitic acid and camphoronic acid; an aromatic monocarboxylic acid, such as benzoic acid, toluic acid, cuminic acid, hemellitic acid and mesitylenic acid; an aromatic polycarboxylic acid, such as phthalic acid, isophthalic acid, terephthalic acid, trimellitic acid, trimesic acid, mellophanic acid and pyromellitic acid; and other carboxylic acids, such as phenylacetic acid, hydratropic acid, hydrocinnamic acid, mandelic acid, phenylsuccinic acid, atropic acid, cinnamic acid, methyl cinnamate, benzyl cinnamate, cinnamylideneacetic acid, coumaric acid and umbellic acid.

The dye-containing curable composition of the invention can be preferably used for forming colored pixels of a color filter used for a liquid crystal display device and a solid state image sensing device (such as CCD and CMOS), and for producing a printing ink, an ink for ink-jet printing and a paint.

<Color Filter and Process for Producing the Color Filter>

The color filter of the invention will be described in detail with reference to the production process thereof.

In the process for producing a color filter according to the invention, a color filter can be produced by using the composition containing at least the alkali soluble resin and the azaporphyrin compound (dye) represented by the formula (1), and preferably by using the dye-containing curable composition according to the invention. Accordingly, the color filter of the invention contains the alkali soluble resin, the azaporphyrin compound (dye) represented by the formula (1), the photosensitive compound and the solvent and can be constituted by using the same components as in the dye-containing curable composition of the invention as described in the foregoing.

In the case where the dye-containing curable composition of the invention is constituted as a negative type, the negative dye-containing curable composition is coated on a support by a coating method, such as spin coating, flow coating and roll coating, to form a radiation sensitive composition layer, which is then exposed through a prescribed mask pattern, followed by being developed with a developer, to form a negative colored pattern (image forming step). The process may further contain, depending on necessity, a curing step for curing the thus formed colored pattern by heating and/or exposure.

In the case where the dye-containing curable composition of the invention is constituted as a positive type, the positive dye-containing curable composition is coated on a support by a coating method, such as spin coating, flow coating and roll coating, to form a radiation sensitive composition layer, which is then exposed through a prescribed mask pattern, followed by being developed with a developer, to form a positive colored pattern (image forming step). Thereafter, thus formed colored pattern is cured by heating (post-baking step).

Upon production of a color filter, a color filter having prescribed hues can be produced by repeating, in the number of the hues, the image forming step (and the curing step depending on necessity) in the case of the negative type, or by repeating, in the number of the hues, the image forming step and the post-baking step in the case of the positive type.

As light or a radiation used herein, an ultraviolet ray, such as g-line, h-line and i-line, is particularly preferably used.

Examples of the support include soda glass, PYREX™ (R) glass and quartz glass, which are used in a liquid crystal display device or the like, those having a transparent electro-conductive film adhered, and a photoelectric conversion element substrate, such as a silicon substrate, and a complementary metallic oxide semiconductor (CMOS), which are used in a solid state image sensing device or the like. There are some cases where black stripes for separating pixels are formed on the support.

An undercoating layer may be provided, depending on necessity, on the support for improvement of adhesion to the upper layer, prevention of diffusion of substances, and planarization of the surface of the substrate.

The developer may be any one that has such a formulation that dissolves an uncured part of the dye-containing curable composition of the invention but does not dissolve a cured part thereof. Specific examples thereof include a combination of various kinds of organic solvents and an alkali aqueous solution. Examples of the organic solvent include those having been described for preparation of the dye-containing curable composition of the invention.

Preferred examples of the alkali aqueous solution include alkali aqueous solutions obtained by dissolving such an alkali compound to a concentration of 0.001 to 10% by mass, and preferably from 0.01 to 1% by mass, as sodium hydroxide, potassium hydroxide, sodium carbonate, sodium silicate, sodium metasilicate, aqueous ammonia, ethylamine, diethylamine, dimethylmethanolamine, tetramethylammonium hydroxide, tetraethylammonium hydroxide, choline, pyrrole, piperidine and 1,8-diazabicyclo-(5.4.0)-7-undecene. In the case where a developer containing the alkali aqueous solution is used, the layer thus developed is generally washed with water.

The color filter according to the invention is suitable for a liquid crystal display device and a solid state image sensing device, and particularly suitable for CCD, a CMOS device and an electroluminescence device of high resolution exceeding 1,000,000 pixels. The color filter according to the invention can be used, for example, as such a color filter that is disposed between light accepting parts of pixels and microlenses for light condensation, which constitute CCD.

EXAMPLES

The present invention will be described in more detail with reference to examples, but the invention is not construed as being limited to the examples unless the spirit and scope of the invention is overrode. All the "parts" are by mass unless otherwise indicated.

Synthesis Example 1

Synthesis of Azaporphyrin Compound in Specific Example 44

Phthalic anhydride (7.4 g), pyridine-2,3-dicarboxylic acid (8.4 g), urea (36 g), copper(I) chloride (2.5 g) and ammonium molybdate (0.4 g) were suspended in 70 mL of 1-chloronaphthalene, and the mixture was stirred at 190 to 220° C. for 5 hours. Then, the reaction mixture was poured into 250 mL of methanol, and the precipitated was filtered followed by washing with methanol, water and acetone in this order. The solid obtained was dried (post treatment step) to obtain 12.8 g of blue unsubstituted azaporphyrin compound.

This unsubstituted azaporphyrin compound (12 g) was added in 120 g of chlorosulfonic acid in small portions at a temperature of not higher than 20° C. in 30 minutes. Then, the temperature was increased to 70 to 80° C., the solution was stirred at the same temperature for 1 hour, and the temperature was increased again to 130 to 135° C. for 2 hours. The reaction was continued at the same temperature for 4 hours, followed by cooling to 80° C. After adding 20 g of thionyl chloride dropwise in 1 hour while the temperature is kept at 70 to 80° C., the solution was stirred at 70 to 80° C. for 2 hours. The solution was cooled to 15 to 20° C., and was continued to stir for 12 hours at the same temperature. The reaction solution was discharged in small portions into 1,000 g of ice water, and the precipitate was separated by filtration. Then, the precipitate was washed with ice water for neutralization to obtain sulfonyl chloride compound of tetraazaporphyrin compound as a hydrated paste (chlorosulfonylation step). The compound was immediately poured into 400 g of ice water and, after stirring for 30 minutes at a temperature of not higher than 10° C. for dispersion, 20 g of 3-butoxypropylamne was added dropwise (amidation step).

Subsequently, the dispersion solution was heated at 20 to 30° C. and, after stirring for 18 hours at the same temperature, the product was separated by filtration. The filtered solid was dispersed in 200 g of water and, after repeating filtration twice, the filtered solid was dried at 60° C. for 16 hours to obtain 10 g of blue powder (post treatment step). Blue crystals (6.4 g) was obtained by recrystallization from ethyl acetate.

The blue crystal was confirmed to have an average number of the sulfone amide group of 1.9 per one molecule from X-ray fluorescence analysis based on the ratio between the fluorescence intensity of the copper atom as a central metal of the azaporphyrin frame and the fluorescence intensity of the sulfur atom of the sulfone amide group.

This blue crystal (5 g) was purified by silica gel column chromatography using a mixed solution of toluene/methanol as an eluent to obtain 1.5 g of purified blue powder. The purified blue powder was confirmed to have an average number of the sulfone amide group of 2 per one molecule from X-ray fluorescence analysis based on the ratio between the fluorescence intensity of the copper atom as a central metal of the azaporphyrin frame and the fluorescence intensity of the sulfur atom of the sulfone amide group. The azaporphyrin compound in Specific example 44 was confirmed to comprise a main component having two introduced pyridine rings from m/z=964 and 771 obtained from FD-MS analysis.

Synthesis Example 2

Synthesis of Azaporphyrin Compound in Specific Example 8

Phthalic anhydride (11.1 g), pyridine-2,3-dicarboxylic acid (4.2 g), urea (36 g), copper (I) chloride (2.5 g) and ammonium molybdate (0.4 g) were suspended in 70 mL of 1,3-dimethyl-2-imidazolydinone, and the solution was stirred at 190 to 220° C. for 5 hours. Unsubstituted tetraazaporphyrin (12.3 g) was obtained by applying the same post-treatment as in Synthesis Example 1. Blue crystals (6.1 g) were obtained after chlorosulfonylation, amidation and post-treatment as in Synthesis Example 1.

The blue crystal was confirmed to have an average number of the sulfone amide group of 2.9 per one molecule from X-ray fluorescence analysis based on the ratio between the fluorescence intensity of the copper atom as a central metal of the azaporphyrin frame and the fluorescence intensity of the sulfur atom of the sulfone amide group.

This crystal (5 g) was purified by silica gel column chromatography using a mixed solution of toluene/methanol as an eluent to obtain 1.7 g of purified blue powder. The purified blue powder was confirmed to have an average number of the sulfone amide group of 3 per one molecule from X-ray fluorescence analysis based on the ratio between the fluorescence intensity of the copper atom as a central metal of the azaporphyrin frame and the fluorescence intensity of the sulfur atom of the sulfone amide group. The azaporphyrin compound in Specific example 8 was confirmed to comprise a main component having one introduced pyridine rings from m/z =1156 and 963 obtained from FD-MS analysis.

Synthesis Example 3

Synthesis of Azaporphyrin Compound in Specific Example 93

Phthalic anhydride (3.7 g), pyridine-2,3-dicarboxylic acid (12.5 g), urea (36 g), copper (I) chloride (2.5 g) and ammonium molybdate (0.4 g) were suspended in 70 mL of 1,3-dimethyl-2-imidazolydinone, and the solution was stirred at 190 to 220° C. for 5 hours. Unsubstituted tetraazaporphyrin compound (11.5 g) was obtained by applying the same post-treatment as in Synthesis Example 1. Blue crystals (5.7 g) were obtained after chlorosulfonylation, amidation and post-treatment as in Synthesis Example 1, except that 25 g of 3-(2-ethylhexyloxy)propylamine was used in place of 20 g of 3-butoxypropylamine in Synthesis Example 1. The blue crystal was confirmed to have an average number of the sulfone amide group of 1.3 per one molecule from X-ray fluorescence analysis based on the ratio between the fluorescence intensity of the copper atom as a central metal of the azaporphyrin frame and the fluorescence intensity of the sulfur atom of the sulfone amide group.

This blue crystal (4 g) was purified by silica gel column chromatography using a mixed solution of toluene/methanol as an eluent to obtain 2.2 g of purified blue powder. The purified blue powder was confirmed to have an average number of the sulfone amide group of 1 per one molecule from X-ray fluorescence analysis based on the ratio between the fluorescence intensity of the copper atom as a central metal of the azaporphyrin frame and the fluorescence intensity of the sulfur atom of the sulfone amide group. The azaporphyrin compound in Specific example 93 was confirmed to comprise a main component having one introduced pyridine rings from m/z =828 and 1076 obtained from FD-MS analysis.

Synthesis Example 4

Synthesis of Azaporphyrin Compound in Specific Example 48

Blue crystals (5.7 g) were obtained by the same method as in Synthetic Example 1, except that 25 g of bis(2-methoxyethyl)amine was used in place of 20 g of 3-butoxypropylamine used in Synthetic Example 1.

This blue crystal was confirmed to have an average number of the sulfone amide group of 2.1 per one molecule from X-ray fluorescence analysis based on the ratio between the fluorescence intensity of the copper atom as a central metal of the azaporphyrin frame and the fluorescence intensity of the sulfur atom of the sulfone amide group.

This blue crystal (5 g) was purified by silica gel column chromatography using a mixed solution of toluene/methanol as an eluent to obtain 2.6 g of purified blue powder. The purified blue powder was confirmed to have an average number of the sulfone amide group of 2 per one molecule from X-ray fluorescence analysis based on the ratio between the fluorescence intensity of the copper atom as a central metal of the azaporphyrin frame and the fluorescence intensity of the sulfur atom of the sulfone amide group. The azaporphyrin compound in Specific example 48 was confirmed to comprise a main component having two introduced pyridine rings from m/z=986 and 773 obtained from FD-MS analysis.

Synthesis Example 5

Synthesis of Azaporphyrin Compound in Specific Example 17

Blue crystals (6.1 g) were obtained by the same method as in Synthetic Example 2, except that 20 g of 2-ethylhexylamine was used in place of 20 g of 3-butoxypropylamine used in Synthesis Example 2. This blue crystal was confirmed to have an average number of the sulfone amide group of 2.8 per one molecule from X-ray fluorescence analysis based on the ratio between the fluorescence intensity of the copper atom as a central metal of the azaporphyrin frame and the fluorescence intensity of the sulfur atom of the sulfone amide group.

This blue crystal (5 g) was purified by silica gel column chromatography using a mixed solution of toluene/methanol as an eluent to obtain 1.9 g of purified blue powder. The purified blue powder was confirmed to have an average number of the sulfone amide group of 3 per one molecule from X-ray fluorescence analysis based on the ratio between the fluorescence intensity of the copper atom as a central metal of the azaporphyrin frame and the fluorescence intensity of the sulfur atom of the sulfone amide group. The azaporphyrin compound in Specific example 17 was confirmed to comprise a main component having one introduced pyridine rings from m/z=1150 and 959 obtained from FD-MS analysis.

Synthesis Example 6

Synthesis of Azaporphyrin Compound in Specific Example 26

Blue crystals (3.7 g) were obtained by the same method as in Synthetic Example 2, except that 20 g of 2-amino-1-methoxybutane was used in place of 20 g of 3-butoxypropylamine used in Synthesis Example 2. This blue crystal was confirmed to have an average number of the sulfone amide group of 2.9 per one molecule from X-ray fluorescence analysis based on the ratio between the fluorescence intensity of the copper atom as a central metal of the azaporphyrin frame and the fluorescence intensity of the sulfur atom of the sulfone amide group.

This blue crystal (3 g) was purified by silica gel column chromatography using a mixed solution of toluene/methanol as an eluent to obtain 1.2 g of purified blue powder.

The purified blue powder was confirmed to have an average number of the sulfone amide group of 3 per one molecule from X-ray fluorescence analysis based on the ratio between the fluorescence intensity of the copper atom as a central metal of the azaporphyrin frame and the fluorescence intensity of the sulfur atom of the sulfone amide group. The azaporphyrin compound in Specific example 26 was confirmed to comprise a main component having one introduced pyridine rings from m/z =1072 and 907 obtained from FD-MS analysis.

Synthesis Example 7

Synthesis of Azaporphyrin Compound in Specific Example 29

Blue crystals (5.5 g) were obtained by the same method as in Synthetic Example 2, except that 5 g of 2-amino-1-(2-ethoxyethoxy)butane and 10 g of triethylamine were used in place of 20 g of 3-butoxypropylamine used in Synthesis Example 2. This blue crystal was confirmed to have an average number of the sulfone amide group of 3.1 per one molecule from X-ray fluorescence analysis based on the ratio between the fluorescence intensity of the copper atom as a central metal of the azaporphyrin frame and the fluorescence intensity of the sulfur atom of the sulfone amide group.

This blue crystal (4 g) was purified by silica gel column chromatography using a mixed solution of toluene/methanol as an eluent to obtain 1.7 g of purified blue powder. The purified blue powder was confirmed to have an average number of the sulfone amide group of 3 per one molecule from X-ray fluorescence analysis based on the ratio between the fluorescence intensity of the copper atom as a central metal of the azaporphyrin frame and the fluorescence intensity of the sulfur atom. The azaporphyrin compound in Specific example 29 was confirmed to comprise a main component having one introduced pyridine rings from m/z=1246 and 1023 obtained from FD-MS analysis.

Synthesis Example 8

Synthesis of Azaporphyrin Compound in Specific Example 33

Blue crystals (6.4 g) were obtained by the same method as in Synthetic Example 2, except that 20 g of L-valine methyl ester hydrochloride and 15 g of triethylamine were used in place of 20 g of 3-butoxypropylamine used in Synthesis Example 2. This blue crystal was confirmed to have an average number of the sulfone amide group of 3.1 per one molecule from X-ray fluorescence analysis based on the ratio between the fluorescence intensity of the copper atom as a central metal of the azaporphyrin frame and the fluorescence intensity of the sulfur atom of the sulfone amide group.

This blue crystal (5 g) was purified by silica gel column chromatography using a mixed solution of toluene/methanol as an eluent to obtain 2.2 g of purified blue powder. The purified blue powder was confirmed to have an average number of the sulfone amide group of 3 per one molecule from X-ray fluorescence analysis based on the ratio between the fluorescence intensity of the copper atom as a central metal of the azaporphyrin frame and the fluorescence intensity of the sulfur atom of the sulfone amide group. The azaporphyrin compound in Specific example 33 was confirmed to comprise a main component having one introduced pyridine rings from m/z=1156 and 963 obtained from FD-MS analysis.

Comparative Synthesis Example 1

Copper phthalocyanine (12 g), manufactured by Tokyo Kasei Kogyo Ltd. was added to 120 g of chlorosulfonic acid in small portions at a temperature of not higher than 20° C. in 30 minutes. Then, the reaction temperature was increased to 70 to 80° C. followed by stirring for additional 1 hour at the same temperature. The temperature was raised to 130 to 135° C. thereafter in 2 hours, and the mixture was allowed to react for 4 hours at the same temperature followed by cooling to 80° C. Thionyl chloride (20 g) was added dropwise in 1 hour while the temperature was kept at 70 to 80° C., followed by stirring for additional 4 hours at 70 to 80° C. The reaction solution was cooled to 15 to 20° C. with further stirring for 12 hours at the same temperature.

The reaction solution was discharged into 1,000 g of ice water. The precipitates formed were separated by filtration, washed with ice water for neutralization to obtain an aqueous paste of phthalocyanine sulfonyl chloride. This product was immediately poured into 400 g of ice water and, after stirring the slurry for 30 minutes at a temperature of not higher than 10° C., 20 g of 3-butoxypropylamine was added dropwise to the slurry. Subsequently, the temperature was raised to 20 to 30° C., and the slurry was stirred at the same temperature for 18 hours. The product was separated by filtration, and the precipitate was washed with 200 g each of water by repeating dispersion and filtration twice. The product was dried at 60° C. for 15 hours to obtain 15 g of a blue powder. The powder was recrystallized from ethyl acetate to obtain 6.4 g of blue crystals (comparative dye 1). The purified blue powder was confirmed to have an average number of the sulfone amide group of 3.8 per one molecule from X-ray fluorescence analysis based on the ratio between the fluorescence intensity of the copper atom as a central metal of the phthalocyanine frame and the fluorescence intensity of the sulfur atom of the sulfone amide group.

Example 1

1) Preparation of Resist Solution

The following composition was mixed and dissolved to prepare a resist solution.

| [Composition] | |
|---|---|
| ethyl lactate(EL) | 59.0 parts |
| alkali-soluble resin | 30.5 parts |
| (benzyl methacrylic acid/methacrylic acid/2-hydroxyethyl methacrylate copolymer (= 60:20:20 in molar ratio)) in 41% propyleneglycol monomethylether acetate/ethyl lactate (1/1 in mass ratio) solution) | |
| dipentaerythritol hexaacrylate | 10.0 parts |
| polymerization inhibitor (p-methoxyphenol) | 0.006 parts |
| photopolymerization initiator (trade name: TAZ-107, manufactured by Midori Chemical Co.) | 0.58 parts |

2) Preparation of Glass Substrate with an Undercoat Layer

A glass substrate (Corning 1737) was washed with aqueous 0.5% NaOH by irradiating ultrasonic wave, followed by washing with water, dehydration and baking (200° C./20 minutes). Then, the resist solution obtained in 1) was applied on the glass substrate after washing with a thickness of 2 μm using a spin coater, and a cured film (undercoat layer) was formed by drying for 1 hour by heating at 220° C.

3) Preparation of Dye Resist Solution (Negative-Type Dye-Containing Curable Composition)

The resist solution (9.0 g) obtained in 1) and azaporphyrin compound (1.0 g) Specific example 44 obtained as a dye in Synthesis Example 1 were mixed to obtain a dye resist solution (the dye-containing curable composition (negative-type) of the invention).

4) Exposure and Development of Dye-Containing Curable Composition (Image-Forming Step)

The dye resist solution obtained in 3) was applied on the undercoat layer of the glass substrate with the underlayer using a spin coater so that the thickness of the layer is 1.0 μm, and the coating layer was pre-baked at 110° C. for 120 seconds. The spectroscopic spectrum of the coated substrate showed a good transmittance curve with an absorption maximum at 600 nm as measured with a chromaticity meter (trade name: MCPD-1000, manufactured by Otsuka Electronic CO.). FIG. 1 shows the spectroscopic spectrum. Heat resistance and light fastness evaluated by the following evaluation method were also excellent Subsequently, the coated layer was irradiated with a light at a wavelength of 365 nm using an exposure device with a luminous energy of 500 mJ/cm$^2$ through a mask with a thickness of 20 μm. After irradiation, the substrate was developed at 25° C. for 40 seconds using a developer (trade name: CD-2000, manufactured by Fuji Film Arch Co.). The substrate was rinsed in running water, and a cyan color pattern image was obtained after spray-drying. The image formed was confirmed by a conventional method by observation under an optical microscope observation and using SEM photograph. The pattern image profile was rectangular when evaluated by the following method. The results are shown in Table 10.

[Evaluation Method and Evaluation Criteria]

—Spectroscopic Spectrum—

A: The spectroscopic spectrum of the coated substrate showed a minimum transmittance wavelength of 600 nm±5 nm in the wavelength range of 570 to 700 nm.

B: The minimum transmittance wavelength was out of the wavelength of 600 nm±5 nm.

—Heat Resistance—

The glass substrate coated with the dye resist was placed on a hot plate so that the substrate surface contact the hot plate, and was heated at 200° C. for 1 hour. The changes of chromaticity before and after placing on the hot plate, or color difference ΔEab, were measured using a chromaticity meter (trade name: MCPD-1000, manufactured by Otsuka Electronic Co.). ΔEab obtained was used as an index indicating the extent of heat resistance, and was evaluated by the following criteria. The smaller ΔEab value shows better heat resistance.

[Criteria]
A: ΔEab≦5
B: 5<ΔEab<10
C: ΔEab≧10

Light Fastness

The glass substrate coated with the dye resist was irradiated wit a xenon lamp at an illuminance of 50,000 lux for 20 hours (corresponds to 1,000,000 lux·h), and the changes of chromaticity before and after irradiation, or ΔEab, were measured. The ΔEab value obtained was used as an index indicating the extent of light fastness, and was evaluated according to the following criteria. The smaller ΔEab value shows the better light fastness.

[Criteria]
A: ΔEab≦3
B: 3<ΔEab<10
C: ΔEab≧10

—Profile—

The cross section of the pattern was observed by the SEM image, and was evaluated according to the following criteria.
A: the pattern of the cross section was rectangular
B: the pattern of the cross section was slightly tapered
C: the pattern of the cross section was tapered Examples 2 to 20, Comparative Example 1

Figure 3:
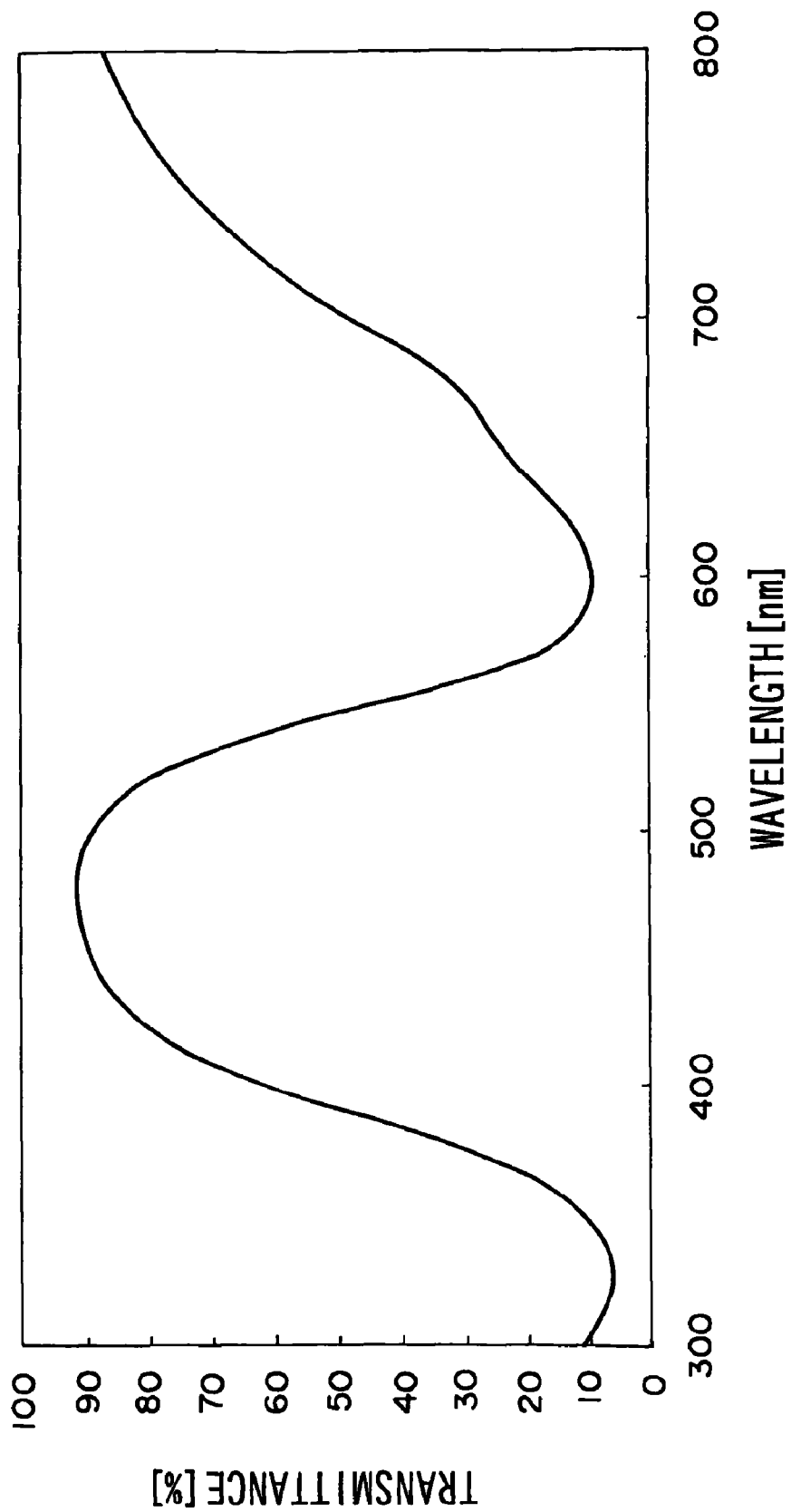
FIG. 3 shows a spectroscopic spectrum of the dye obtained in Example 3.
Figure 4:
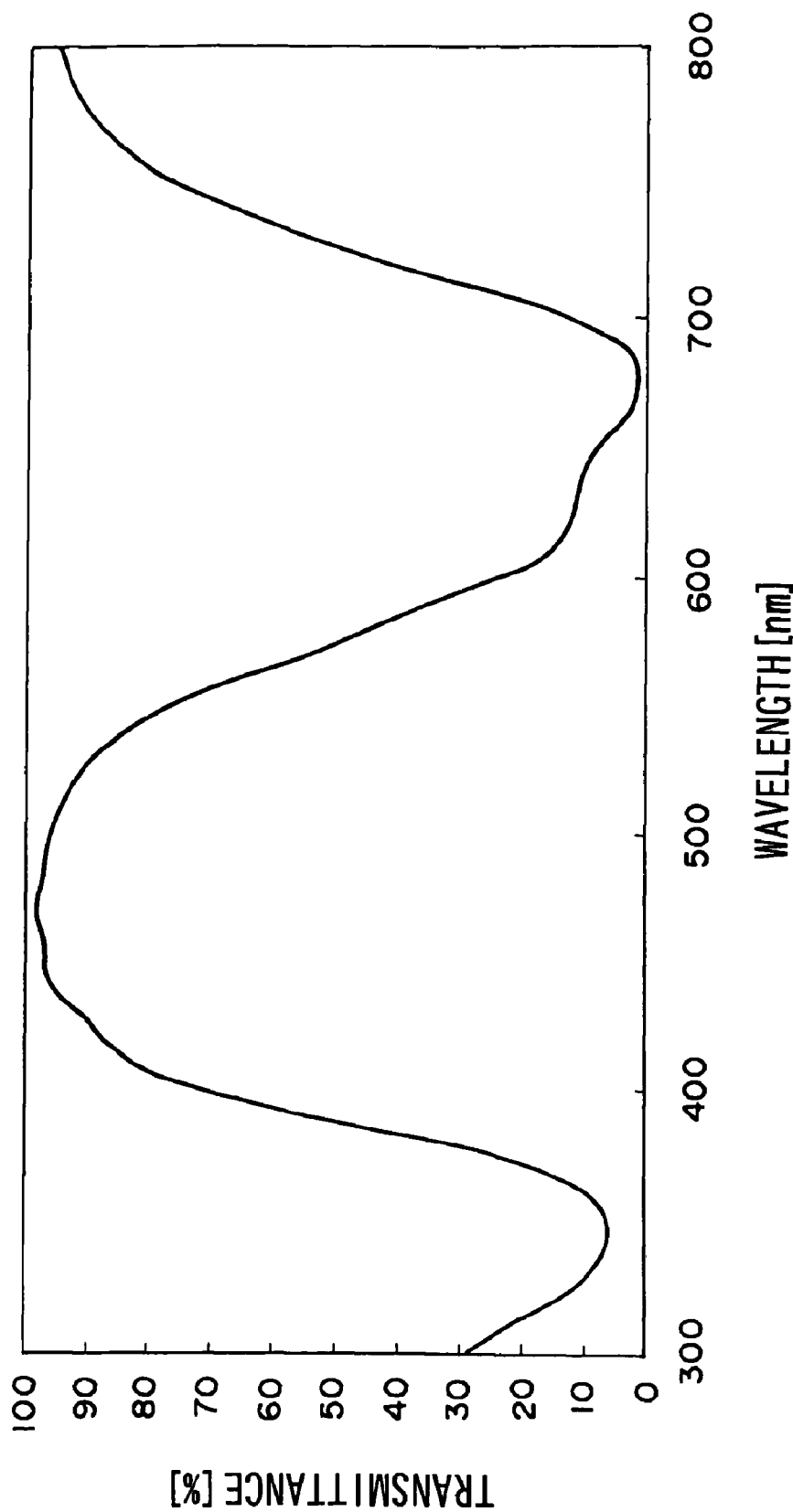
FIG. 4 shows a spectroscopic spectrum of the dye obtained in Comparative Example 1.

Pattern images were formed by the same method as in Example 1, except that the dye used for preparing the dye resist solution 3) in Example 1 was changed to each dye shown in Table 10, and the images were evaluated. The results of evaluation are shown in Table 10. Spectroscopic spectra in Examples 2 and 3, and Comparative Example 1 are shown in FIGS. 2 to 4, respectively.

While the performance of the dyes in the examples was identical to the performance of the dye in the comparative example except spectroscopic characteristics, the spectroscopic characteristics of the dye of the invention were superior to those of the dye of the comparative example.

TABLE 10

| | Dye | Spectroscopy | Heat Resistance | Light Fastness | Profile |
|---|---|---|---|---|---|
| Example 1 | Specific example 44 | A | A | A | A |
| Example 2 | Specific example 8 | A | A | A | A |
| Example 3 | Specific example 93 | A | A | A | A |
| Example 4 | Specific example 48 | A | A | A | A |
| Example 5 | Specific example 17 | A | A | A | A |
| Example 6 | Specific example 26 | A | A | A | A |
| Example 7 | Specific example 29 | A | A | A | A |
| Example 8 | Specific example 65 | A | A | A | A |
| Example 9 | Specific example 77 | A | A | A | A |
| Example 10 | Specific example 12 | A | A | A | A |
| Example 11 | Specific example 15 | A | A | A | A |
| Example 12 | Specific example 22 | A | A | A | A |
| Example 13 | Specific example 37 | A | A | A | A |
| Example 14 | Specific example 41 | A | A | A | A |
| Example 15 | Specific example 62 | A | A | A | A |
| Example 16 | Specific example 88 | A | A | A | A |
| Example 17 | Specific example 90 | A | A | A | A |
| Example 18 | Specific example 98 | A | A | A | A |
| Example 19 | Specific example 112 | A | A | A | A |
| Example 20 | Specific example 124 | A | A | A | A |
| Comparative Example 1 | Dye in Comparative Synthetic Example 1 | C | A | A | A |

As shown in the table above, the spectroscopic characteristics of the azaporphyrin compound represented by formula (1) was excellent with absorption at near 660 nm. The dye-containing curable composition of the invention containing the azaporphyrin compound as the dye was excellent in heat resistance and light fastness with a rectangular profile of the pattern image.

On the other hand, the composition that does not satisfy the requirement of the invention was unable to afford a desired spectroscopic spectrum with weak absorption at 600 nm.

Example 21

1) Dye Resist Solution (Positive-Type Dye-Containing Curable Composition)

A photoresist solution (the dye-containing curable composition (positive-type) of the invention) was obtained by mixing and dissolving the composition below.

| [Composition] | |
|---|---|
| ethyl lactate (EL) | 15 parts |
| propyleneglycol monomethylether acetate (PGMEA) | 15 parts |
| resin P-1 below | 3.0 parts |
| naphthoquinone diazide compound N-1 below | 1.8 parts |
| hexamethoxymethylol modified melamine (cross-linking agent) | 0.6 parts |
| TAZ-107 (photooxidation agent manufactured by Midori Chemical Co.) | 1.2 parts |
| fluorinated surfactant (trade name: F-475, manufactured by Dai-Nippon Ink Chemical Industry Co.) | 0.0005 parts |
| dye (dye in azaporphyrin compound Specific example 44) | 1.5 parts |

—Synthesis of Resin P-1—

Benzyl methacrylate (70.0 g), methacrylic acid (13.0 g), 2-hydroxyethyl methacrylate (17.0 g), ethyl lactate (300 g) and propyleneglycol monomethylether acetate (300 g) were placed in a three-neck flask equipped with a stirrer, reflux condenser and thermometer, and the mixture was stirred for 10 hours at 65° C. in a nitrogen stream after adding a catalytic quantity of a polymerization initiator (trade name: V-65, manufactured by Wako Pure Chemical Industries, Inc.). The resin solution obtained was dripped into 20 L of ion-exchange water with vigorous stirring to obtain a white powder. The white powder obtained was dried at 40° C. for 20 hours in vacuum to obtain 140 g of resin P-1. This resin P-1 had a weight average molecular weight of 27,000 and number average molecular weight of 10,500 as measured by GPC.

—Synthesis of naphthoquinone diazide Compound N-1—

Trisp-PA (42.45 g: manufactured by Honshu Chemical Co.), o-naphthoquinone diazide-5-sulfonylchloride (61.80 g) and acetone (300 ml) were placed in a three-neck flask, and triethylamine (24.44 g) was added dropwise at room temperature in 1 hour. After stirring for 2 hours after completing dropwise addition, the reaction solution was poured into a large volume of water with stirring. Precipitated Naphthoquinone diazide sulfonic acid was collected by suction filtration, and the product was dried in vacuum for 24 hours at 40° C. to obtain naphthoquinone diazide compound N-1.

2) Exposure, Development and Evaluation of the Dye-Containing Curable Composition A cyan color pattern image was obtained by coating, prebaking, irradiation, development, rinsing and drying as in Example 1, and the pattern obtained was heated at 180° C. for 5 minutes. The pattern image formed had a rectangular profile. Storability of the dye-containing curable composition, and heat resistance and light fastness of the pattern image were evaluated by the same method as in Example 1. All the evaluation items were excellent as shown in Table 11.

Examples 22 to 30, Comparative example 2

The pattern images were formed by the same method as in Example 21, except that the dye used for preparing the dye resist solution 3) in Example 21 was changed to each dye in Table 11, and the patterns were evaluated. The results of evaluation are shown in Table 11.

TABLE 11

| | Dye | Spectroscopy | Heat Resistance | Light Fastness | Profile |
|---|---|---|---|---|---|
| Example 21 | Specific example 44 | A | A | A | A |
| Example 22 | Specific example 8 | A | A | A | A |
| Example 23 | Specific example 93 | A | A | A | A |
| Example 24 | Specific example 48 | A | A | A | A |
| Example 25 | Specific example 17 | A | A | A | A |
| Example 26 | Specific example 26 | A | A | A | A |
| Example 27 | Specific example 29 | A | A | A | A |
| Example 28 | Specific example 65 | A | A | A | A |
| Example 29 | Specific example 77 | A | A | A | A |
| Example 30 | Specific example 12 | A | A | A | A |
| Comparative Example 2 | Dye in Comparative Synthetic Example 1 | C | A | A | A |

Examples 31 to 60

The pattern images were formed by the same procedure as in Example 1, except that the glass substrates used in Examples 1 to 30 were changed to silicon wafer substrates. Then, square patterns with a size of 2 μm were irradiated with a luminous energy of 500 mJ/cm² using an i-line contraction projection exposure device, and after irradiation the images formed were developed at 23° C. for 60 seconds using a developer (trade name: CD-2000 manufactured by Fuji Film Arch Co.) After rinsing the substrate in running water for 30 seconds, the substrate was spray-dried to thereby obtain a pattern suitable for a CCD color filter having a rectangular cross section The invention provides a stable dye-containing curable composition containing the azaporphyrin compound being excellent in spectroscopic characteristics and solubility in solvents to render the composition excellent in heat resistance and light fastness. The dye-containing curable composition of the invention is particularly suitable as a cyan color composition.

The invention also provides a method for producing a color filter that exhibit sharp and good hue and is excellent in heat resistance and light fastness, and a method for producing a color filter that is constructed to have rectangular patters with high resolution and is excellent in heat resistance and light fastness.

What is claimed is:

1. A dye-containing curable composition comprising at least an alkali-soluble resin, a dye, a photosensitive compound, and a cross-linking agent, wherein the photosensitive compound is a photopolymerization initiator; and wherein the dye is an azaporphyrin compound represented by the following formula (1):

Formula (1)

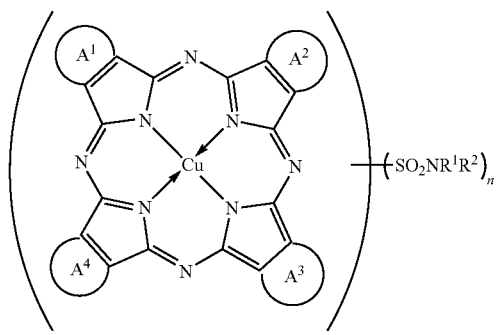

wherein $R^1$ and $R^2$ each independently represents a hydrogen atom or a substituted or unsubstituted alkyl group; rings represented by $A^1$, $A^2$, $A^3$ and $A^4$ each independently represents a ring structure represented by the following formula (A) or formula (B); at least one of $A^1$, $A^2$, $A^3$ and $A^4$ is a ring structure represented by the following formula (B); and n represents an integer from 1 to 4:

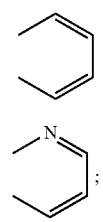

Formula (A)

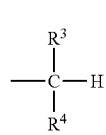

Formula (B)

wherein at least one of $R^1$ and $R^2$ in formula (1) is a substituent represented by the following formula (2):

Formula (2)

$$-\underset{R^4}{\overset{R^3}{\underset{|}{C}}}-H$$

wherein $R^3$ and $R^4$ each independently represents a hydrogen atom, an alkyl group containing an oxygen atom in the form of an ether bond, a carbonyl bond or an ester bond, an alkylcarbonyl group or an alkoxycarbonyl group; and wherein at least one of $R^3$ and $R^4$ in formula (2) is an alkyl group with a carbon number of 1 to 12 containing 1 to 4 oxygen atoms in the form of ether bonds, carbonyl bonds or ester bonds, an alkylcarbonyl group with a carbon number of 2 to 12, or an alkoxycarbonyl group with a carbon number of 2 to 12.

2. The dye-containing curable composition according to claim 1, wherein $A^1$, $A^2$, $A^3$ and $A^4$ in formula (1) have substituents other than —$SO_2NR^1R^2$.

3. The dye-containing curable composition according to claim 2, wherein the substituent other than —$SO_2NR^1R^2$ is an alkyl group, an alkoxy group, a halogen atom or a nitro group.

4. The dye-containing curable composition according to claim 1, wherein at least two and not more than three of $A^1$, $A^2$, $A^3$ and $A^4$ are ring structures represented by the formula (B).

5. The dye-containing curable composition according to claim 1, wherein at least one of $R^3$ and $R^4$ in formula (2) is an alkyl group with a carbon number of 1 to 12 containing 1 to 4 oxygen atoms in the form of ether bonds.

6. A dye-containing curable composition comprising at least an alkali-soluble resin, a dye, a photosensitive compound, and a cross-linking agent, wherein the photosensitive compound is a photopolymerization initiator; and wherein the dye is an azaporphyrin compound represented by the following formula (1):

Formula (1)

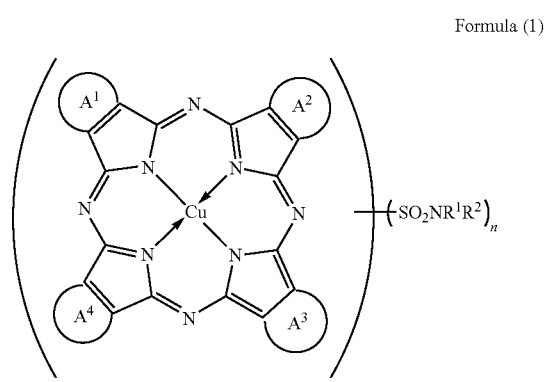

wherein $R^1$ and $R^2$ each independently represents a hydrogen atom or a substituted or unsubstituted alkyl group; rings represented by $A^1$, $A^2$, $A^3$ and $A^4$ each independently represents a ring structure represented by the following formula (A) or formula (B); at least one and not more than three of $A^1$, $A^2$, $A^3$ and $A^4$ is a ring structure represented by the following formula (B); and n represents an integer from 1 to 4:

Formula (A)

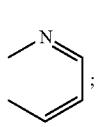

Formula (B)

wherein at least one of $R^1$ and $R^2$ in formula (1) is a substituent represented by the following formula (2):

Formula (2)

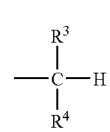

wherein $R^3$ and $R^4$ each independently represents a hydrogen atom, an unsubstituted alkyl group, an alkyl group containing an oxygen atom in the form of an ether bond, a carbonyl bond or an ester bond, an alkylcarbonyl group or an alkoxycarbonyl group; and wherein at least one of $R^3$ and $R^4$ in formula (2) is an alkyl group with a carbon number of 1 to 12 containing 1 to 4 oxygen atoms in the form of ether bonds, carbonyl bonds or ester bonds, an alkylcarbonyl group with a carbon number of 2 to 12, or an alkoxycarbonyl group with a carbon number of 2 to 12.

7. The dye-containing curable composition according to claim 6, wherein $A^1$, $A^2$, $A^3$ and $A^4$ in formula (1) have substituents other than $-SO_2NR^1R^2$.

8. The dye-containing curable composition according to claim 7, wherein the substituent other than $-SO_2NR^1R^2$ is an alkyl group, an alkoxy group, a halogen atom or a nitro group.

9. The dye-containing curable composition according to claim 6, wherein at least two and not more than three of $A^1$, $A^2$, $A^3$ and $A^4$ are ring structures represented by the formula (B).

10. The dye-containing curable composition according to claim 6, wherein at least one of $R^3$ and $R^4$ in formula (2) is an alkyl group with a carbon number of 1 to 12 containing 1 to 4 oxygen atoms in the form of ether bonds.

* * * * *